US009642170B2

United States Patent
Sohn et al.

(10) Patent No.: US 9,642,170 B2
(45) Date of Patent: May 2, 2017

(54) METHOD FOR TRANSMITTING AND RECEIVING A SIGNAL IN A RESERVED TIME INTERVAL WITH CSMA/CA SCHEME IN A WIRELESS COMMUNICATION SYSTEM

(75) Inventors: Illsoo Sohn, Anyang-si (KR); Sungjin Shin, Seoul (KR); Taeyoung Ha, Seoul (KR); Minseok Kim, Seoul (KR); Suhwook Kim, Anyang-si (KR); Jong-Moon Chung, Seoul (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 266 days.

(21) Appl. No.: 14/350,347

(22) PCT Filed: Aug. 1, 2012

(86) PCT No.: PCT/KR2012/006127
§ 371 (c)(1),
(2), (4) Date: May 19, 2014

(87) PCT Pub. No.: WO2013/051781
PCT Pub. Date: Apr. 11, 2013

(65) Prior Publication Data
US 2014/0286278 A1 Sep. 25, 2014

Related U.S. Application Data

(60) Provisional application No. 61/587,671, filed on Jan. 18, 2012, provisional application No. 61/544,277, filed on Oct. 7, 2011.

(51) Int. Cl.
*H04W 76/02* (2009.01)
*H04W 74/08* (2009.01)
*H04W 84/12* (2009.01)

(52) U.S. Cl.
CPC ....... *H04W 76/02* (2013.01); *H04W 74/0816* (2013.01); *H04W 84/12* (2013.01)

(58) Field of Classification Search
USPC .................................................. 370/328–341
See application file for complete search history.

(56) References Cited

U.S. PATENT DOCUMENTS

| 2006/0198346 A1* | 9/2006 | Liu | H04W 40/24 370/338 |
| 2006/0256737 A1* | 11/2006 | Choi | H04W 40/246 370/254 |

(Continued)

FOREIGN PATENT DOCUMENTS

| KR | 10-2009-0045271 | 5/2009 |
| KR | 10-2010-0120216 | 11/2010 |

(Continued)

OTHER PUBLICATIONS

PCT International Application No. PCT/KR2012/006127, Written Opinion of the International Searching Authority dated Feb. 7, 2013, 16 pages.

*Primary Examiner* — Charles C Jiang
*Assistant Examiner* — Kyaw Z Soe
(74) *Attorney, Agent, or Firm* — Lee Hong Degerman Kang Waimey

(57) ABSTRACT

One embodiment of the present invention relates to a method for transmitting a signal by a first node in a wireless communication system, including the steps of a first node setting a connection for a reserved transmission and transmitting a signal to a first reception node in the time interval reserved as the connection setting, wherein, in the time interval, a signal transmission is allowed by a second node which is not included in the neighbor nodes of the first reception node.

13 Claims, 22 Drawing Sheets

(56) References Cited

U.S. PATENT DOCUMENTS

| | | | | |
|---|---|---|---|---|
| 2008/0056149 | A1* | 3/2008 | Madhavan | H04W 74/08 370/252 |
| 2008/0298390 | A1* | 12/2008 | Kneckt | H04L 12/5695 370/468 |
| 2009/0016295 | A1* | 1/2009 | Li | H04L 5/0007 370/330 |
| 2009/0279496 | A1* | 11/2009 | Raissi-Dehkordi | H04W 16/04 370/329 |
| 2009/0279514 | A1* | 11/2009 | Seok | H04W 74/0816 370/336 |
| 2009/0310592 | A1* | 12/2009 | Kessleman | H04W 72/121 370/347 |
| 2010/0142551 | A1* | 6/2010 | Mosko | H04W 72/0486 370/461 |
| 2010/0254281 | A1* | 10/2010 | Kim | H04L 67/104 370/252 |
| 2011/0206033 | A1* | 8/2011 | Ahn | H04W 74/0816 370/350 |

FOREIGN PATENT DOCUMENTS

| | | | | |
|---|---|---|---|---|
| KR | WO 2010126282 A2 * | 11/2010 | | H04W 56/0075 |
| KR | 10-2011-0016926 | 2/2011 | | |
| KR | 10-2011-0068405 | 6/2011 | | |
| WO | WO 2010126282 A2 * | 11/2010 | | H04W 56/0075 |

* cited by examiner

FIG. 14
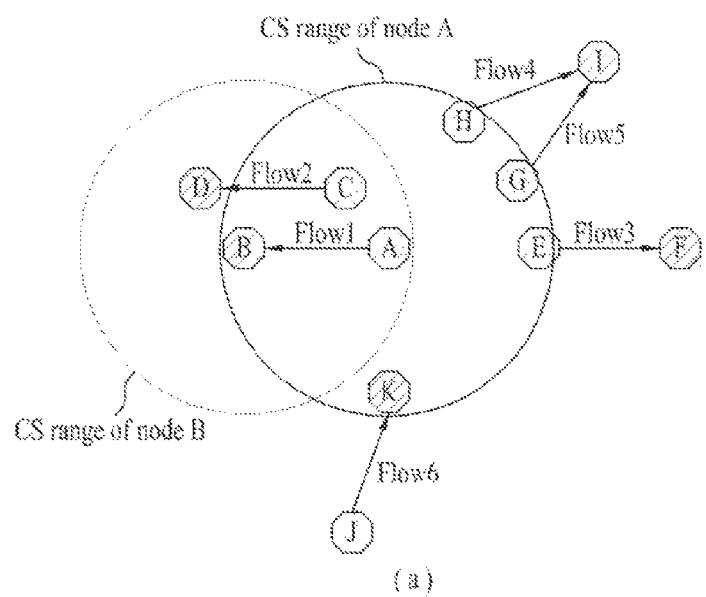
(a)
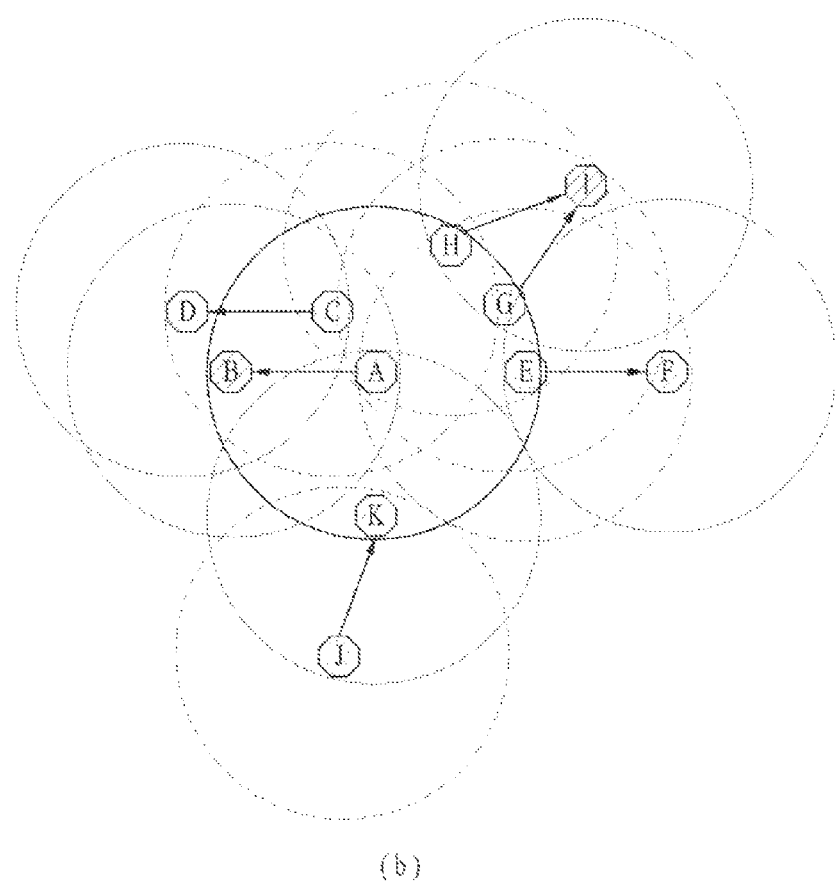
(b)

METHOD FOR TRANSMITTING AND RECEIVING A SIGNAL IN A RESERVED TIME INTERVAL WITH CSMA/CA SCHEME IN A WIRELESS COMMUNICATION SYSTEM

CROSS-REFERENCE TO RELATED APPLICATIONS

This application is the National Stage filing under 35 U.S.C. 371 of International Application No. PCT/KR2012/006127, filed on Aug. 1, 2012, which claims the benefit of U.S. Provisional Application Ser. Nos. 61/587,671, filed on Jan. 18, 2012, and 61/544,277, filed Oct. 7, 2011, the contents of which are all hereby incorporated by reference herein in their entirety.

TECHNICAL FIELD

The present invention relates to a method and apparatus for transmitting and receiving signals of a plurality of devices configured to perform concurrent transmission in a wireless communication system.

BACKGROUND ART

Standards for Wireless Local Area Network (WLAN) technology have been developed as Institute of Electrical and Electronics Engineers (IEEE) 802.11 specifications. IEEE 802.11b may provide a maximum transfer rate of 11 Mbps, and IEEE 802.11a may provide a maximum transfer rate of 54 Mbps. IEEE 802.11g may use Orthogonal Frequency Division Multiplexing (OFDM) at 2.4 GHz, and provide a transfer rate of 54 Mbps. IEEE 802.11n may use Multiple Input Multiple Output (MIMO)-OFDM, and provide a transfer rate of 300 Mbps to four spatial streams. IEEE 802.11a and 802.11b use an unlicensed band at 2.4 GHz or 5 GHz. IEEE 802.11b provides a transmission rate of 11 Mbps and IEEE 802.11a provides a transmission rate of 54 Mbps. IEEE 802.11g applies Orthogonal Frequency-Division Multiplexing (OFDM) at 2.4 GHz to provide a transmission rate of 54 Mbps. IEEE 802.11n may use Multiple Input Multiple Output (MIMO)-OFDM, and provide a transfer rate of 300 Mbps. IEEE 802.11n may support a channel bandwidth up to 40 MHz to provide a transfer rate of 600 Mbps.

DISCLOSURE

Technical Problem

An object of the present invention is to provide a medium access scheme for supporting Device-to-Device (D2D) communication in an infrastructure environment, a protocol and device, and a protocol and device for use in the medium access scheme. More particularly, the present invention relates to methods for allowing nodes to perform simultaneous access and methods for efficiently supporting the simultaneous access of the node.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting a signal by a first node in a wireless communication system including: performing connection establishment for reserved transmission by a first node; and transmitting a signal to a first reception node within a time interval reserved by the connection establishment, wherein signal transmission of a second node not included in a neighbor node of the first reception node is allowed within the time interval.

In a second technical aspect of the present invention, a first node device for use in a wireless communication system includes: a transceiver; and a processor configured to control the device including the transceiver, wherein the processor performs connection establishment for reserved transmission, and transmits a signal to a first reception node within a time interval reserved by the connection establishment, wherein signal transmission of a second node not included in a neighbor node of the first reception node is allowed within the time interval.

The first and second technical aspects may include all or some parts of the following items.

The first node may retransmit neighbor node information received from the first reception node to the first reception node during the connection establishment performing process.

The neighbor node information may indicate a neighbor node of the first reception node. The neighbor node information may indicate a node not corresponding to the neighbor node of the first reception node from among neighbor nodes of the first node. The neighbor node information may indicate a node corresponding to the neighbor node of the first reception node from among neighbor nodes of the first node.

The neighbor node information may be transmitted simultaneously with data transmission during the connection establishment performing process.

The neighbor node may be a node included in a carrier sensing (CA) region of each node.

The reserved time interval may be any one of periodic time intervals.

A second reception (Rx) node configured to receive a signal from the second node is not included in the neighbor node of the first reception node.

The connection establishment performing process may include: transmitting a connection request message for the predetermined time interval; receiving a connection response message in response to the connection request message; and transmitting data after reception of the connection response message.

For signal transmission within the time interval, the second node may perform connection establishment with a second reception node after completion of connection establishment of the first node.

For signal transmission within the time interval, the second node may perform connection establishment with a second reception node during a predetermined reservation period after completion of connection establishment of the first node. The reservation period may be configured in a manner that only nodes not included in the neighbor node of the first reception node perform channel access contention.

Advantageous Effects

As is apparent from the above description, the embodiments of the present invention can efficiently use frequency resources during D2D communication because an available unlicensed band is used according to a frequency division multiplexing (FDM) scheme.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 14 is a conceptual diagram illustrating a communication environment according to one embodiment of the present invention.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

General structures of the WLAN system will hereinafter be described with reference to FIGS. 1 and 2.

Figure 1:
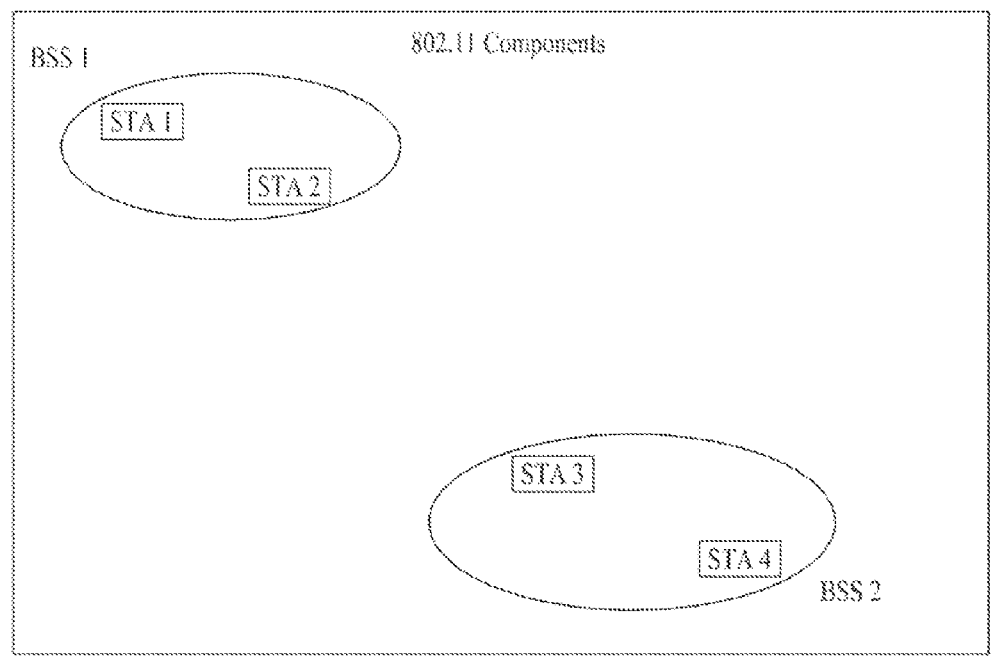
FIG. 1 exemplarily shows one example of a wireless LAN (WLAN) system.

FIG. 1 illustrates an exemplary configuration of a wireless LAN (WLAN) system.

As shown in FIG. 1, the WLAN system includes one or more Basic Service Sets (BSSs). A BSS is a set of Stations (STAs) which can communicate with each other after successfully achieving synchronization.

The STA is a logical entity that includes an interface for a physical layer of a wireless medium and a Medium Access Control (MAC) layer. STAs include access point (AP) and non-AP stations. Among STAs, a mobile terminal that is operated by a user may be a non-AP STA. When the term "STA" is stated, it may refer to a non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides an associated station (STA), which is coupled to the AP, with a connection to a Distribution System (DS) through a wireless medium. The AP may be referred to as a centralized controller, a Base Station (BS), a Node-B, a Base Transceiver System (BTS), a site controller, etc.

The BSS may be classified into an infrastructure BSS and an independent BSS (IBSS).

Each BSS shown in FIG. 1 is an IBSS. The IBSS is a BSS that does not include an AP. Since the IBSS does not include an AP, the IBSS is not allowed to connect to a DS and thus forms a self-contained network.

Figure 2:
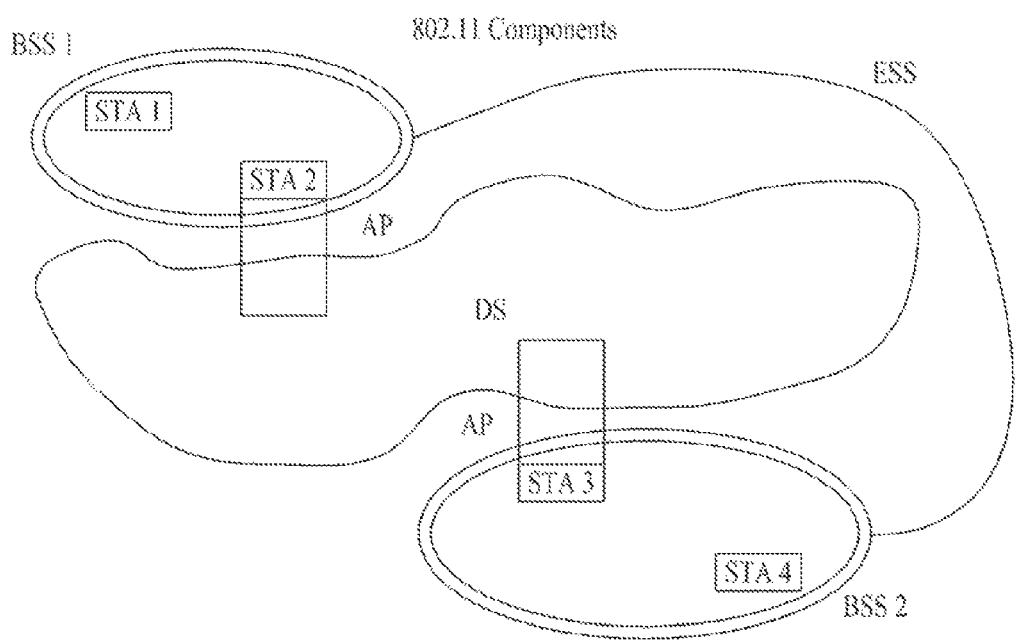
FIG. 2 exemplarily shows another example of a WLAN system.

FIG. 2 illustrates another exemplary configuration of the WLAN system.

Each BSS shown in FIG. 2 is an infrastructure BSS. The infrastructure BSS includes one or more STAs and an AP. In the infrastructure BSS, in principle, communication between non-AP STAs is performed via an AP. However, when a direct link has been established between non-AP STAs, direct communication can be performed between the non-AP STAs.

As shown in FIG. 2, a plurality of infrastructure BSSs can be connected to each other through a DS. A plurality of BSSs connected through a DS is referred to as an Extended Service Set (ESS). STAs included in the ESS can communicate with each other. In the same ESS, a non-AP STA can move from one BSS to another BSS while performing seamless communication.

The DS is a service which connects a plurality of APs. The DS is not necessarily a network and there is no limitation to the form of the DS provided that the DS can provide a specific distribution service. For example, the DS may be a wireless network such as a mesh network and may also be a physical structure that connects APs to each other.

A spectrum that is not used by a licensed device may be referred to as a whitespace and used by an unlicensed device. For an operation of an STA in a whitespace spectrum, a protection scheme for an incumbent user needs to be preferentially provided. In order to protect the licensed device, the STA or the AP needs to use only a channel that is not used by the incumbent user. A channel that is not used by the unlicensed device and can be used by the unlicensed device is referred to as an available channel. Examples of a basic method of determining availability of a TV channel by the STA or the AP include spectrum sensing and a method of accessing a DB to acquire information of a TV channel schedule. Information of the DB includes information regarding a usage schedule of a specific channel of the unlicensed device at a specific location. Thus, an STA or AP that desires to check whether a TV channel is available needs to access the DB through the Internet to acquire DB information based on location information of the STA or the AP.

In order to access a network, the STA needs to search for an accessible network. The STA needs to identify a compatible network prior to participation in a wireless network. In this regard, a process of identifying a network present in a specific region is referred to as scanning. Scanning includes active scanning and passive scanning.

Figure 3:
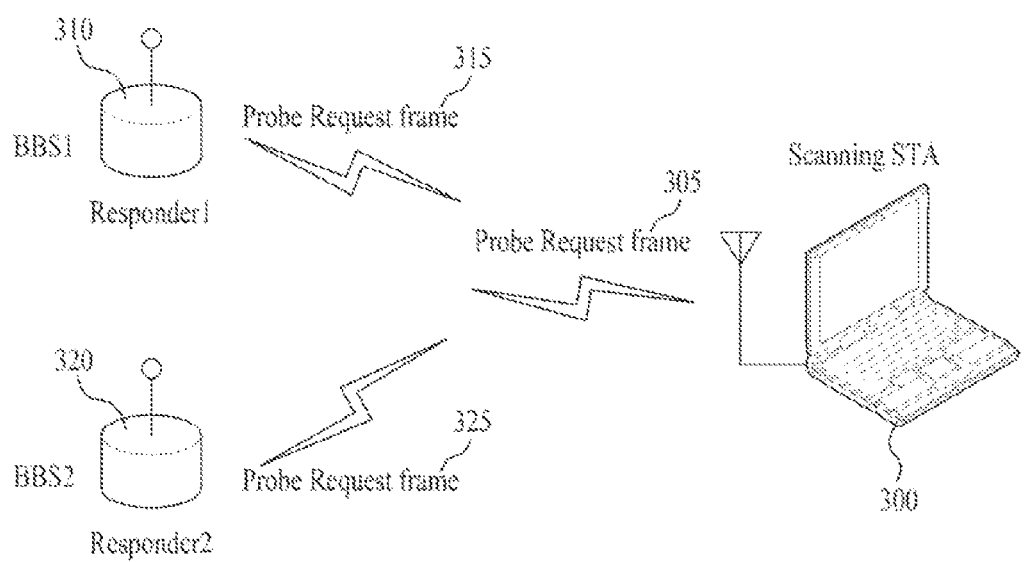
FIG. 3 is a conceptual diagram illustrating active scanning.

FIG. 3 is a schematic diagram of active scanning.

In the active scanning, an STA that performs the scanning transmits a probe request frame and awaits a response thereto in order to investigate APs therearound while moving across channels. A responder transmits a probe response frame in response to the probe request frame to the STA that transmits the probe request frame. Here, the responder is an STA that lastly transmits a beacon frame in a BSS of a channel that is being scanned. In an infrastructure BSS, an AP transmits a beacon frame and thus the AP is a responder. In an IBSS, STAs in the IBSS alternately transmit a beacon frame and thus a responder is not fixed.

Referring to FIG. 3, when a scanning STA 300 transmits a probe request frame 305, a responder 1 310 of a BSS1 and a responder 2 320 of a BSS2, which receive a probe request frame, transmit a probe response frame 1 315 and a probe response frame 2 325 to the scanning STA 300, respectively. The scanning STA 300 that receives a probe response frame stores BSS related information included in the received probe response frame, moves to the next channel, and performs scanning using the same method in the next channel.

Figure 4:
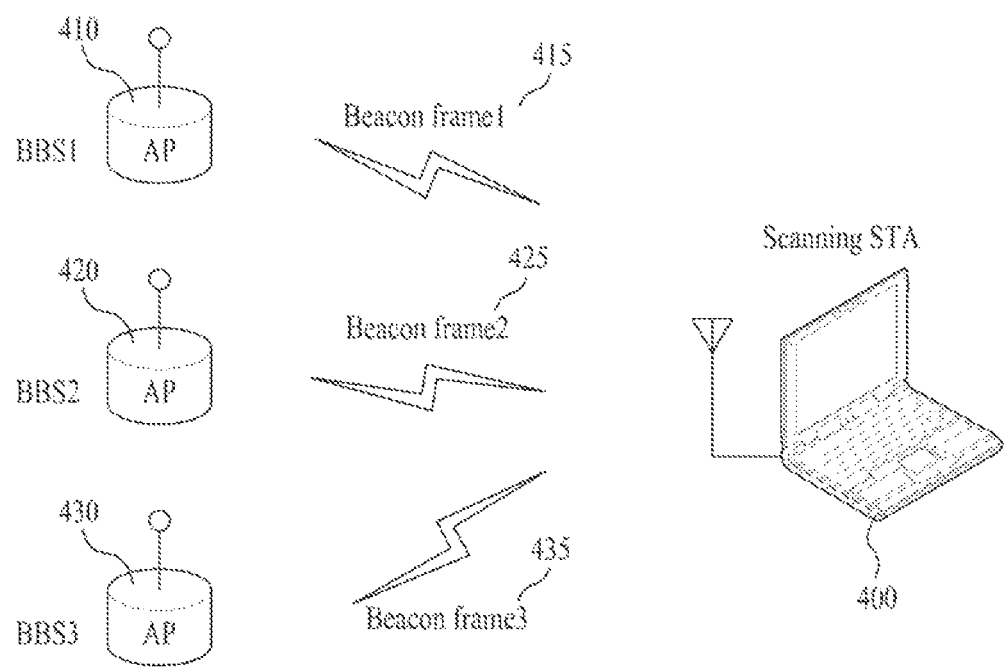
FIG. 4 is a conceptual diagram illustrating passive scanning.

FIG. 4 is a schematic diagram of passive scanning.

In the passive scanning, an STA that performs the scanning awaits a beacon frame while moving across channels. The beacon frame is a management frame in the IEEE 802.11 and is periodically transmitted so as to indicate existence of a wireless network and to allow the STA that performs the scanning to search for a wireless network and to participate in the wireless network. In an infrastructure BSS, an AP periodically transmits a beacon frame.

When the STA that performs the scanning receives a beacon frame, the STA stores information regarding a BSS included in the beacon frame and records beacon frame information at each channel while moving to another channel.

In FIG. 4, when a scanning STA 400 that performs channel scanning using a passive scanning method in a specific channel receives a beacon frame 1 415 transmitted from an AP1 410 of a BSS1 and a beacon frame 2 425 transmitted from an AP2 420 of a BSS2 and does not receive a beacon frame 3 435 transmitted from an AP3 430 of a BSS3, the scanning STA 400 stores discovery of two BSSs (BSS1 and BSS2), in a measurement channel and moves to another channel.

Comparing active scanning and passive scanning, the active scanning is more advantageous than the passive scanning in terms of low delay and power consumption.

Meanwhile, the MAC layer operation of a WLAN network based on IEEE 802.11 standard is configured to basically use a Carrier Sense Multiple Access/Collision Avoidance (CSMA/CA) scheme. The CSMA/CA scheme does not include a separate central control device. That is, the CSMA/CA scheme may be considered a MAC (Medium Access Control) scheme based on contention between nodes in a distributed environment. If the nodes configured to monitor a channel status detects continuation of an idle status in which a channel is not used for a specific time, the corresponding node awaits a predetermined backoff time, and then attempts to transmit data or information. If there occurs collision in data transmission, the corresponding node selects an arbitrary numeral in a duration longer than a previous backoff time, awaits as many slots as the arbitrary numeral, and then attempts to retransmit data or information. Through the above-mentioned processing, distributed collision between individual nodes can be prevented from occurring without using the central control device. In addition, in order to solve problems caused by a hidden node, a smaller-sized Ready-to-Send (RTS) frame and a smaller-sized Clear-to-Send (CTS) frame are exchanged before transmission of a data frame, and a necessary channel can be occupied in advance, so that collision between nodes can be prevented from occurring.

In addition, the MAC protocol based on IEEE 802.11 does not allow concurrent transmission within the Carrier Sensing (CS) range so as to prevent transmission failure caused by interference. Concurrent transmission is needed to increase transmission efficiency. Specifically, the necessity of concurrent transmission is rapidly increasing in D2D communication among a large number of devices. Accordingly, various methods for efficiently supporting concurrent transmission within the CS region will hereinafter be described in detail. In the following description, the term 'node' means a device capable of performing wireless communication in a distributed environment including a UE, STA, or D2D communication device. In addition, the CS region may be appreciated as a specific range in which signals can be communicated between one transmission (Tx) node and one reception (Rx) node. Terms '1 hop node' and 'neighbor node' may indicate nodes contained in the CS region of a specific node.

Figure 5:
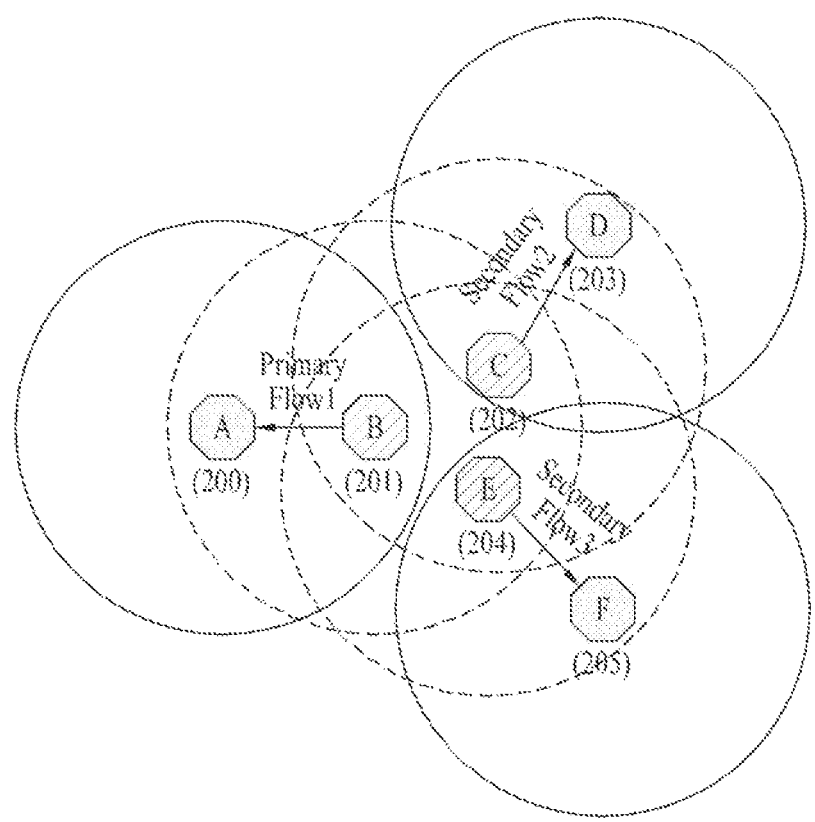
FIG. 5 is a conceptual diagram illustrating concurrent transmission according to one embodiment of the present invention.

FIG. 5 is a conceptual diagram illustrating concurrent transmission according to one embodiment of the present invention. Referring to FIG. 5, individual circles may indicate the CS regions of individual nodes (A, B, C, D, E, F). Specifically, a solid-lined circle may indicate the CS region of a node configured to receive signals, and a dotted-lined circle may indicate the CS region of a node configured to transmit signals.

In FIG. 5, a first node B pre-occupies a channel using the CSMA/CS scheme so that it performs connection establishment for reserved transmission to a first reception (Rx) node A. In accordance with this connection establishment, if signals are transmitted one or more times (or periodically) to the first Rx node A, an exemplary case denoted by Primary Flow 1 is assumed premised. Under this situation, a method for allowing a second node C or a third node E to perform concurrent transmission to a second Rx node D or a third Rx node F will hereinafter be described. In this case, such concurrent transmission may be allowed for a signal transmission node located outside of the CS region of the first Rx node A in consideration of interference of the first Rx node A configured to receive signals from the first node. That is, as can be seen from FIG. 5, the second and third nodes not corresponding to the neighbor nodes of the first Rx node can perform concurrent transmission along with the first node. Alternatively, the case for allowing such concurrent transmission may also be set to one in which the Rx node (i.e., a second node and a third node of FIG. 5) configured to receive signals from the signal transmission nodes is located outside of the CS region of the first Rx node, from among a plurality of nodes configured to transmit signals at a remote site of the CS region of the first Rx node.

As described above, assuming that the second and third nodes can recognize that they are located outside of the CS region of the first Rx node (i.e., the second and third nodes are not used as the neighbor nodes of the first Rx node), the second and third nodes can perform concurrent transmission. For this purpose, when the first node and the first Rx node configured to pre-occupy a channel during contention perform connection establishment, the first Rx node transmits it own neighbor node information, and the first node having received the neighbor node information can retransmit the neighbor node information to the first Rx node. The reason why the first node retransmits the neighbor node information to the first reception node is that the second and third nodes are located outside of the CS region of the first Rx node so that the second and third nodes cannot correctly receive neighbor node information transmitted from the first Rx node to the first node.

A method for transmitting neighbor node information of the first Rx node during the connection establishment process between the first node and the first Rx node will hereinafter be described with reference to FIGS. 6 to 8.

Figure 6:
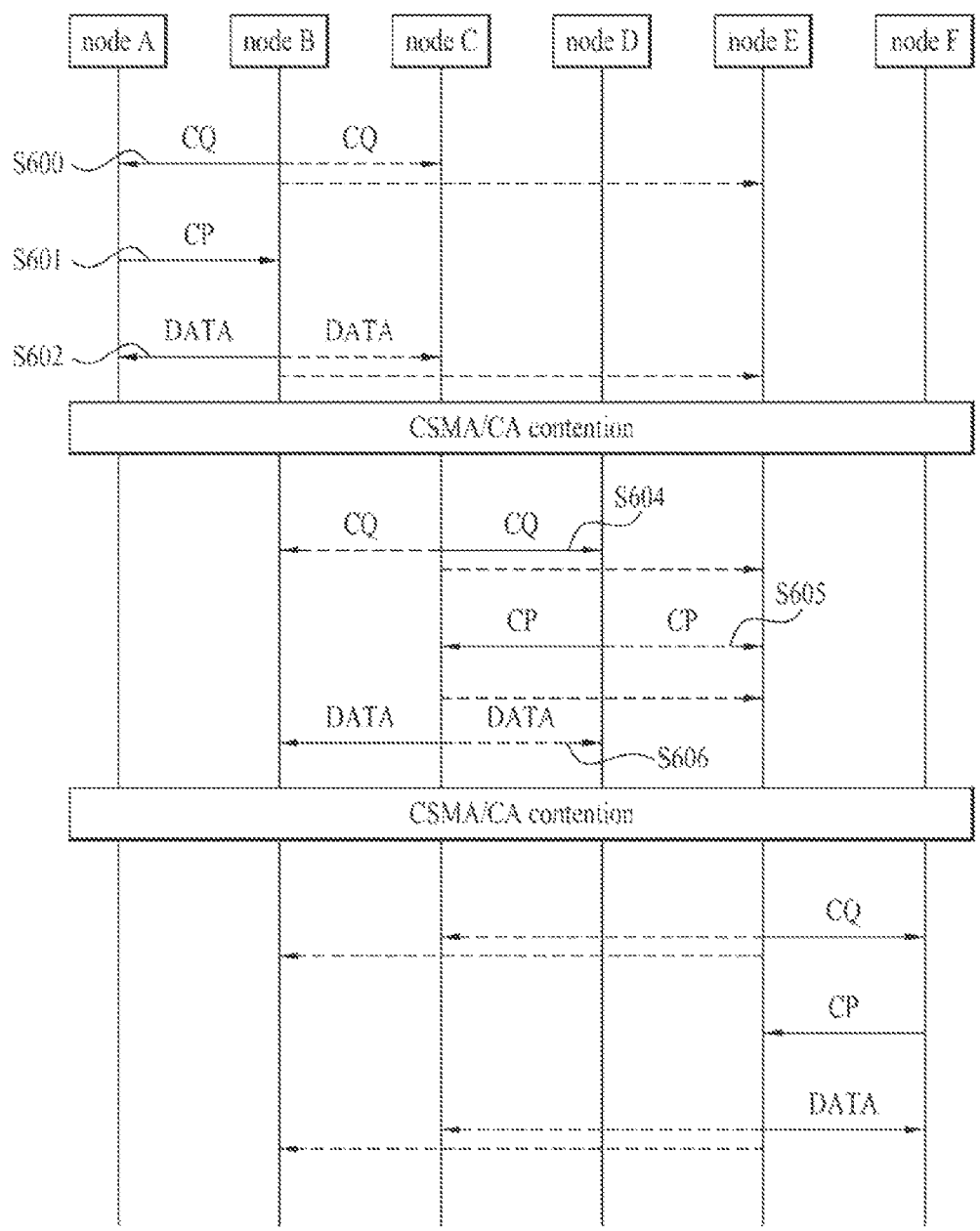
FIG. 6 is a conceptual diagram illustrating a connection establishment process according to one embodiment of the present invention.

FIG. 6 is a conceptual diagram illustrating a connection establishment process according to one embodiment of the present invention. FIG. 7 is a conceptual diagram illustrating a connection establishment process and data transmission. FIG. 8 is a conceptual diagram illustrating exemplary messages for use in the connection establishment process. In FIGS. 6 to 8, it is assumed that the environment of FIG. 5 is used. In FIG. 6, a solid-lined arrow may indicate transmission to a target node of a message. A dotted-lined arrow may indicate the CS region instead of the target node of the message such that overhearing of the corresponding message is possible.

Referring to FIG. 6, a first node configured to pre-occupy the channel may transmit a connection request (CQ) message to the first reception (Rx) node. The CQ message may include reservation information regarding periodic transmission. In addition, the CQ message may include a neighbor node of the first node.

The first Rx node having received the CQ message may transmit a connection reply (CP) message to the first node on the condition that periodic transmission is accepted. The CP message may include neighbor node information of the first Rx node.

The first node having received the CP message may transmit first data to the first Rx node. In this case, the first node may transmit neighbor node information of the first Rx node (Of course, only neighbor node information may be transmitted without using first data). In this case, through neighbor node information, the second and third nodes contained in the CS region of the first Rx node can recognize that they can perform concurrent transmission using reserved transmission resources (e.g., a reserved time interval and/or a frequency band) guaranteed by connection establishment of the first node. Since the resources needed for concurrent transmission are guaranteed, the second node and the third node perform contention (such as CSMA/CA), such that it is possible to perform connection establishment between the second node and the third node.

Figure 7:
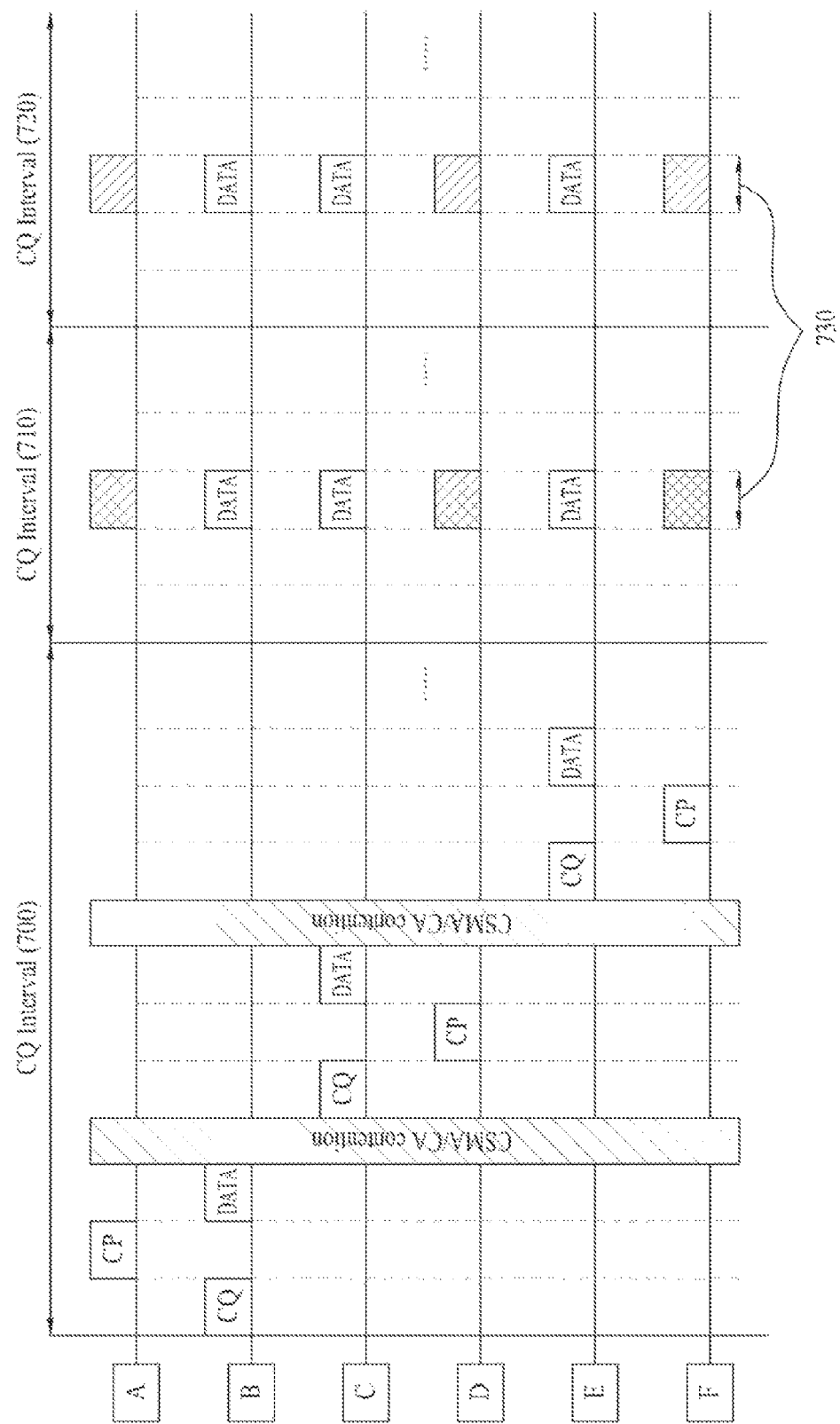
FIG. 7 is a conceptual diagram illustrating a connection establishment process and data transmission.

As described above, after individual nodes perform connection establishment, the individual nodes may transmit data to the Rx node at which each connection establishment is achieved as shown in FIG. 7. In more detail, as can be seen from FIG. 7, connection establishment of the individual nodes is achieved in a first CQ interval 700, and data transmission is achieved in the next CQ intervals (710, 720). Specifically, it can be recognized that the second node and the third node perform concurrent transmission within the time interval 730 in which the first node transmits data to the first Rx node. Here, although FIG. 7 shows an exemplary case in which periodic transmission is reserved during connection establishment, it should be noted that the above-mentioned description can also be applied to UE traffics. In order to implement the above-mentioned concept, various methods can be used, for example, one method in which a predetermined time is added after reception of the CP frame as described above and the remaining transmission (Tx) information can be scheduled, and another method in which data can be transmitted through contention for a Tx time of a data frame without using an additional time in the same manner as in the scheme proposed by S. Hur, etc.

In the above-mentioned description, neighbor node information may indicate a neighbor node of the first Rx node. Here, the second node and the third node listen to neighbor node information retransmitted through the first node, and can perform concurrent transmission after recognizing that they do not belong to the neighbor node information.

Alternatively, if neighbor node information of the first node is contained in the CQ message, a node not corresponding to a neighbor node of the first Rx node from among neighbor nodes of the first node may be indicated by neighbor node information. In this case, the second node and the third node can confirm that they correspond to the neighbor node information, such that the second node and the third node can perform concurrent transmission.

Also, the neighbor node information may indicate a node corresponding to a neighbor node of the first Tx node from among neighbor nodes of the first node. Here, if the second node and the third node correspond to the scope of the neighbor node information, it is impossible for the second node and the third node to perform concurrent transmission.

A detailed example of the neighbor node information will be described later with reference to the communication environment shown in FIG. 14.

Figure 8:
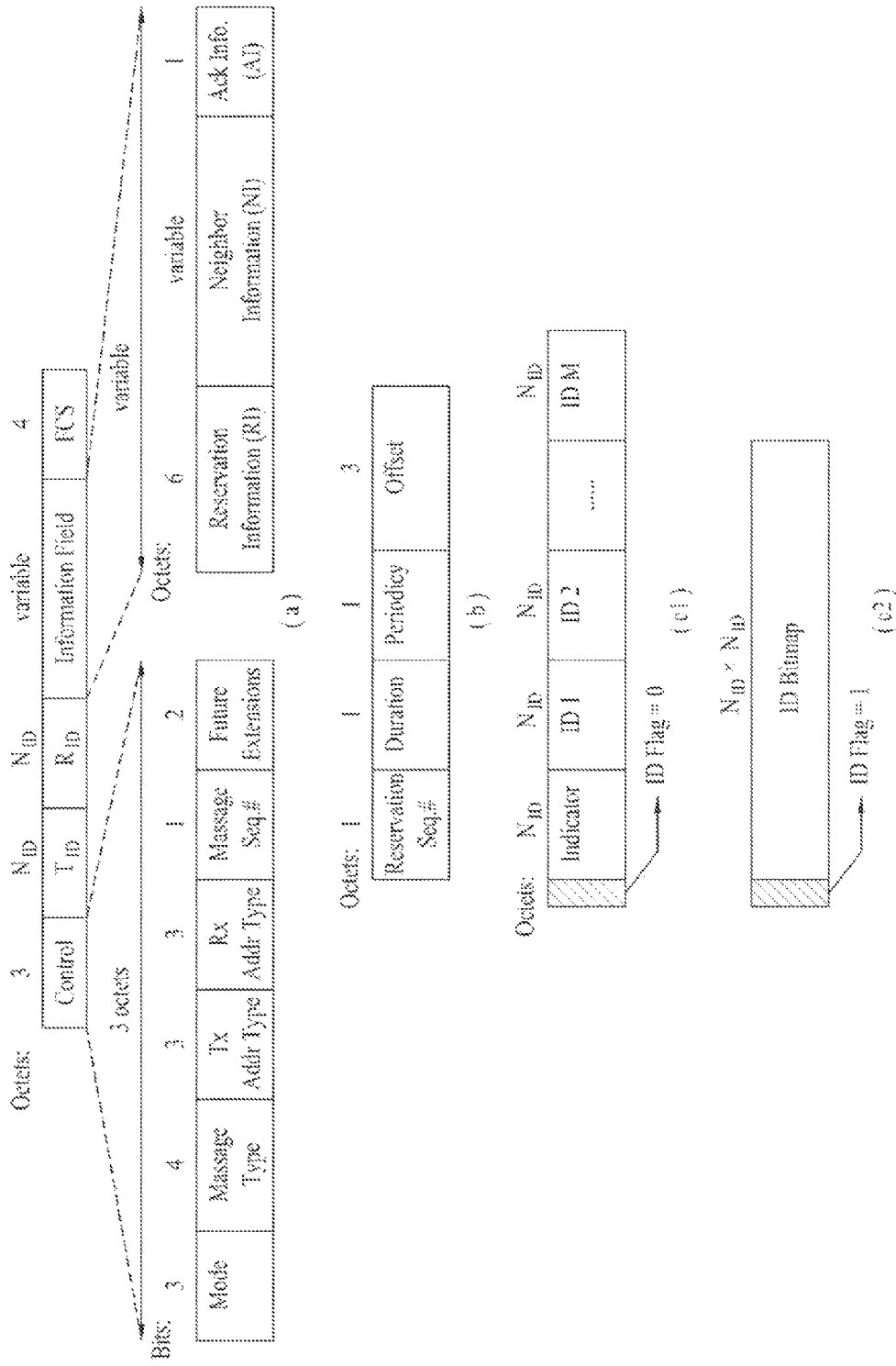
FIG. 8 is a conceptual diagram illustrating exemplary messages for use in the connection establishment process.

Meanwhile, individual nodes shown in the above-mentioned description may perform connection establishment through the message shown in FIG. 8. FIG. 8(a) shows a message for use in connection establishment. FIG. 8(b) shows a detailed example of a reserved information (RI) field, and FIG. 8(c1) and FIG. 8(c2) respectively show examples of neighbor node information (NI).

Referring to FIG. 8(a), the message may include five fields, i.e., a control field, a TID field, an RID field, an information field, and an FCS field. The TID field may indicate an ID of a transmission (Tx) node of the message, and the RID field may indicate an ID of a reception (Rx) node of the message. The ID of a node may indicate numbers allocated to a given network or a corresponding cluster, or may indicate a legacy IP address or MAC address. Here, it is assumed that the node ID may have the size of NID octets. Information as to which ID will be used may be considered a user option, such that different types of IDs can be selected through a Tx Addr Type field and an Rx Addr Type field of the control field part.

The Mode part of the control field may indicate three operation modes available in the proposed protocol, and the Message Type part of the control field may identify message types. The Message Sequence Number part may indicate a serial number of the message.

Continuously, the Information field may include a Reservation Information (RI) part for indicating reservation information, a Neighbor Information (NI) part including neighbor node information, and an Acknowledgement Information (AI) part for Piggybacked Acknowledgement.

The RI field may be configured as shown in FIG. 8(b). That is, the RI field may include a Reservation Sequence Number field, a Duration field, a Periodicity field, and an Offset field. The Duration field may indicate a total length of a specific interval to be reserved, and the Periodicity field may include specific information indicating how many reservation fields will be included in one CQ interval. The Offset field may indicate a start time of the corresponding reservation such that it can indicate how far the reservation start time is spaced apart from the CQ interval.

Two schemes of FIG. 8(c1) and FIG. 8(c2) can be provided according to the neighbor node expression ID flag bit configuration of the NI field. If the ID field is set to zero '0', the schemes of FIG. 8(c1) and FIG. 8(c2) can directly indicate ID numbers of the neighbor nodes, and indicate a total number of IDs indicated by the Indicator field. If the number of nodes is changed, it is necessary to adjust the above-mentioned schemes of FIG. 8(c1) and FIG. 8(c2) in response to the changed number of nodes. If the ID flag is set to '1', the neighbor node information can be expressed through the ID bitmap. In more detail, in order to indicate all neighbor nodes using individual IDs in response to the increasing number of neighbor nodes, the length of a frame is unavoidably increased. In contrast, if there are a small number of neighbor nodes, an ID bitmap indicating the relationship among all nodes may be unnecessary.

In addition, a specific scheme for selectively requesting ACK information from only a necessary frame according to the Piggybacked ACK scheme can be applied to the embodiments of the present invention. In this case, the Acknowledgement Information (AI) field for representing/indicating the specific scheme may also be applicable to the embodiments of the present invention.

In contrast, the embodiments of the present invention may include basic (BS) operation modes shown in FIGS. 5 to 7, a Reservation Period (RP) operation mode, and a Local Scheduling (LS) operation mode. The Mode field of FIG. 8(a) indicates which mode relates to current operations, and can be represented by the following table 1.

TABLE 1

| Value | Description |
| --- | --- |
| 000 | BS mode |
| 001 | RP mode |
| 010 | LS mode |
| 011~111 | For future extension |

In addition, the Message Type field may be classified into 10 sub-fields according to not only message types but also specific information indicating whether the corresponding message includes NI information. The message types may include CQ and CP messages according to the protocol operation principles, Reservation CQ (RCQ) and Reservation CP (RCP) messages used in the RP operation mode, and a DATA message. A detailed description of the above-mentioned message types will be disclosed later. A detailed content of the Message Type field may be represented by the following Table 2.

TABLE 2

| Value | Description |
| --- | --- |
| 0000 | CQ without NI |
| 0001 | CP without NI |
| 0010 | RCQ without NI |
| 0011 | RCP without NI |
| 0100 | DATA without NI |
| 0101~0111 | For future extension |
| 1001 | CQ with NI |
| 1010 | CP with NI |
| 1010 | RCQ with NI |
| 1011 | RCP with NI |
| 1100 | DATA with NI |
| 1101~1111 | For future extension |

The Tx Addr Type field and the Rx Addr Type field can support different formats of address system, and can be implemented by the scheme in which an address to be used is decided on the assumption that all nodes have already recognized the sizes of individual address systems. The above-mentioned information may be represented by the following table 3.

TABLE 3

| Value | Description |
| --- | --- |
| 000 | Id |
| 001 | IP address |
| 010 | Mac address |
| 011 | IP + Mac address |
| 100~111 | For future extension |

As described above, the above-mentioned connection establishment and concurrent transmission relate to the basic operation (BS) mode. The embodiments of the present invention are configured to further define the RP mode and the LS mode.

Figure 9:
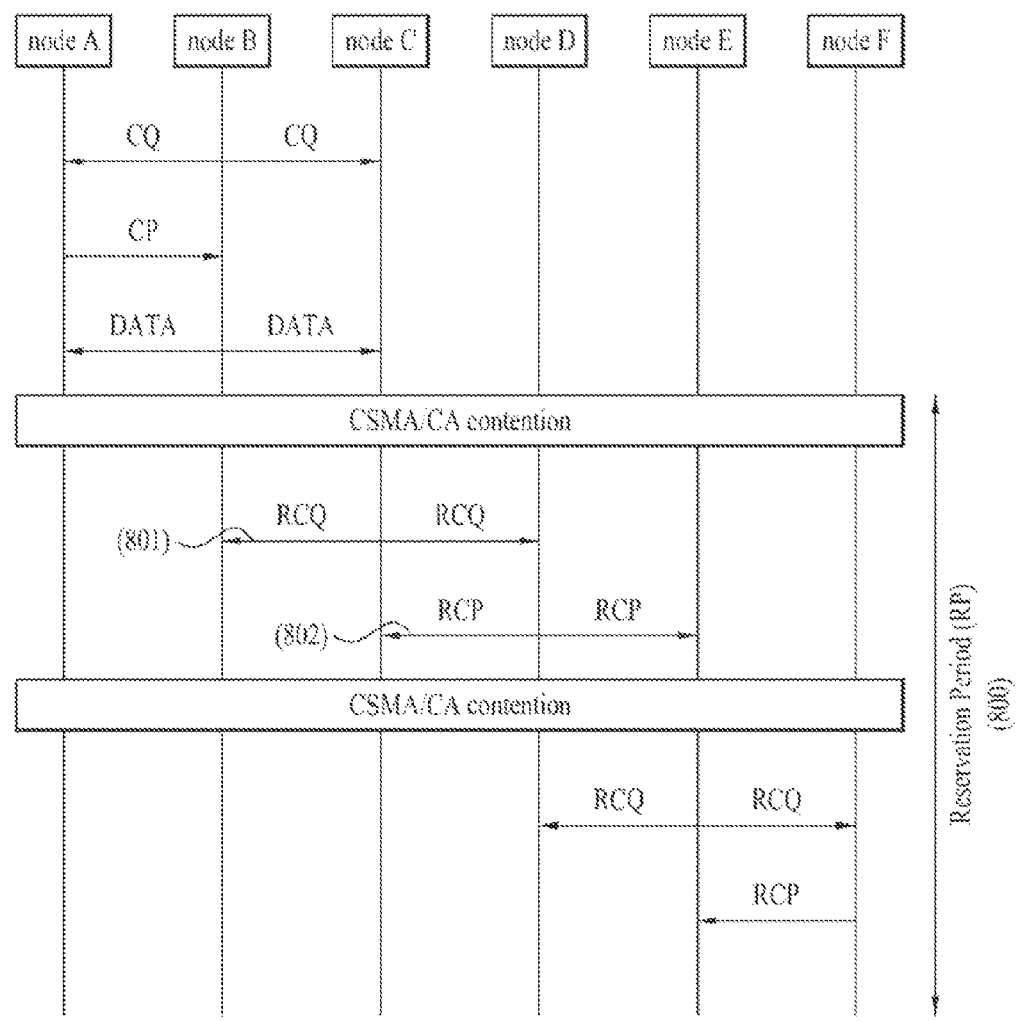
FIGS. 9 and 10 are conceptual diagrams illustrating that the system of one embodiment operates in a reservation period mode.
Figure 10:
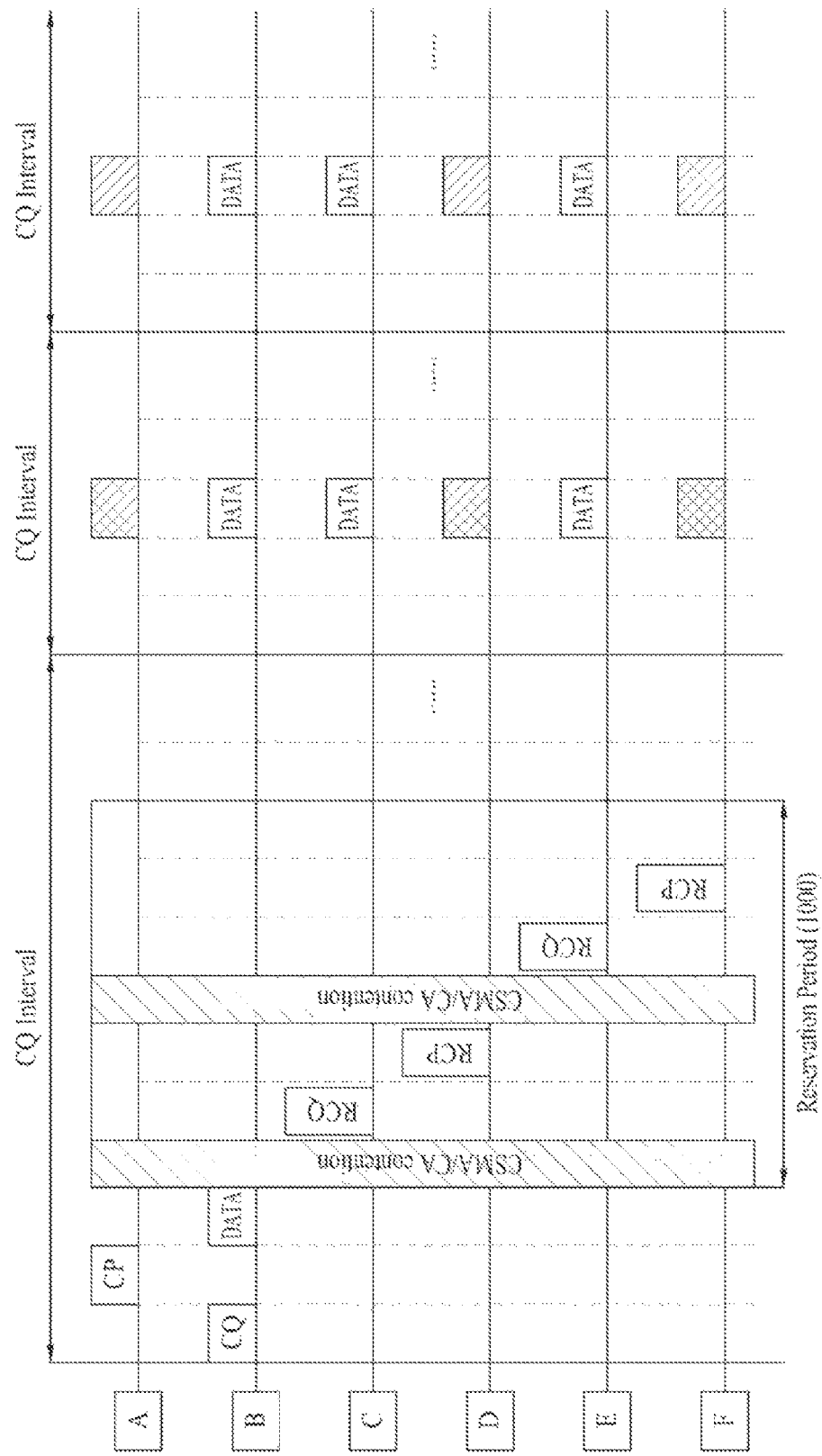

First, the RP mode will hereinafter be described with reference to FIGS. 9 and 10. Nodes that attempt to basically perform concurrent transmission during the BS mode perform contention using the CSMA/CA scheme or the like, and must respectively perform the connection establishment process. During the BS mode, efficiency of the BS mode is decreased in proportion to the increasing number of nodes. Accordingly, the RP mode includes a reservation period in which only specific nodes perform contention so as to perform reservation for concurrent transmission. That is, as shown in FIG. 9, a time interval subsequent to connection establishment of the first node may be configured as a reservation period, and a detailed description thereof will hereinafter be described with reference to FIG. 10. A reservation period 1000 for the RP mode is shown in FIG. 10. In the reservation period 1000, the second and third nodes configured to perform concurrent transmission along with the first node can transmit/receive a Reservation CQ (RCQ) message and a Reservation CP (RCP) message to/from their own reception (Rx) nodes, such that they can perform concurrent transmission within a time interval reserved by the first node. In general, only nodes configured to perform concurrent transmission related to the first node can transmit/receive RCQ and RCP messages through contention so as to perform connection establishment. In this case, the RCQ and RCP messages may be packets that include IDs of Tx/Rx nodes, a desired interval, and reservation information of a period. That is, compared to the BS mode, reservation for concurrent transmission is performed through RCQ and RCP messages having a relatively small amount of overhead, such that load and overhead caused by contention between nodes can be reduced.

Second, the LS mode will hereinafter be described in detail. If the network arrives at a stable status through the BS and RP modes, each node can recognize a transmission time of traffic of the neighbor node and a transmission position of the neighbor node traffic during the LS mode. (for example, previous reservation information can be recognized in the form of a table). An object of the LS operation mode is to allow a specific node to pre-schedule transmission of some neighbor nodes, before channel acquisition and period transmission reservation regarding traffic of a specific node. If the specific node is considered a node that has performed concurrent transmission during the previous reservation transmission, the probability that concurrent transmission can be performed in the same manner as in this reservation transmission may be relatively high.

Figure 11:
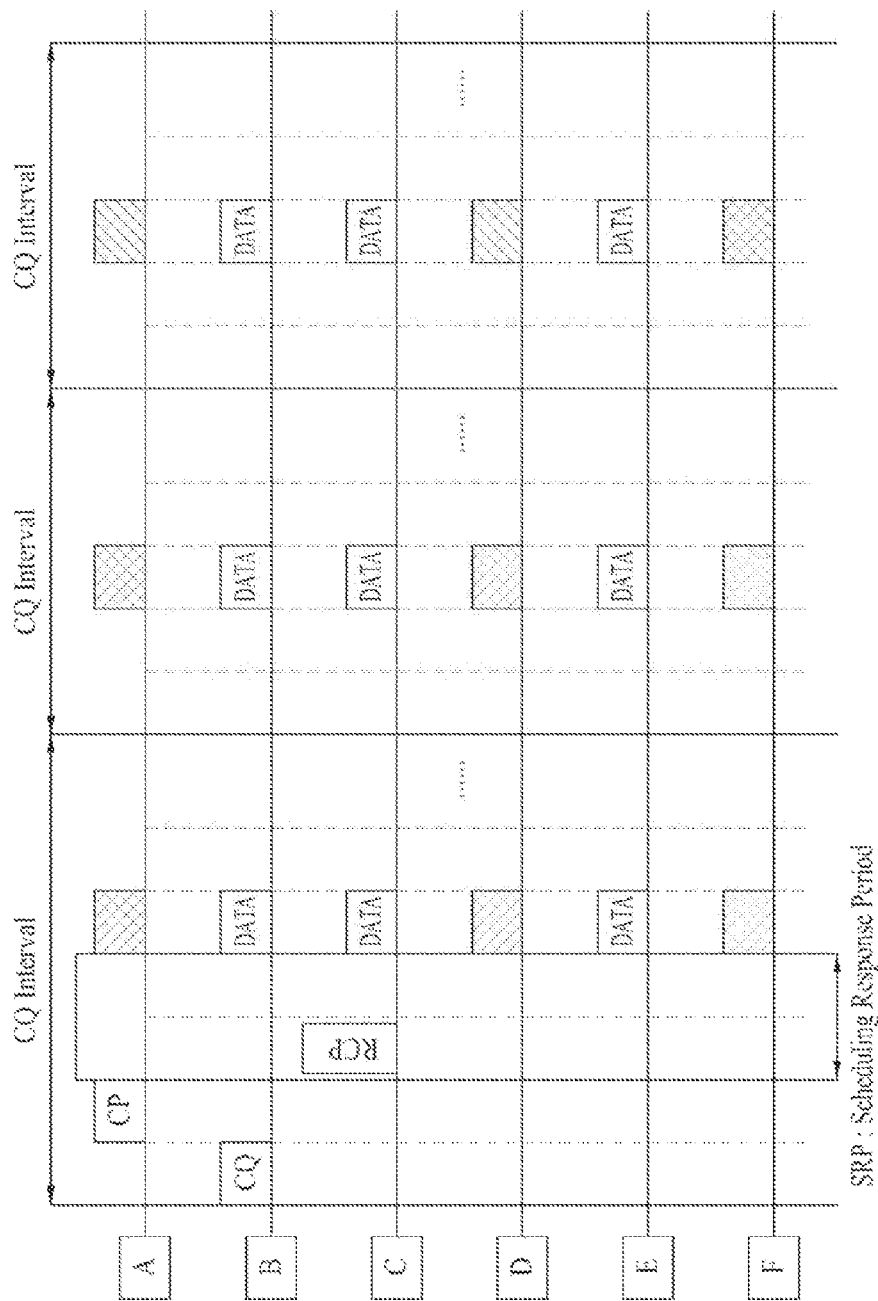
FIGS. 11 and 12 are conceptual diagrams illustrating that the system of one embodiment operates in a regional scheduling mode.

The LS mode will hereinafter be described with reference to FIG. 11. During the connection establishment process, the first node may transmit the CQ message (for example, including IDs of nodes to be scheduled in the NI field) configured according to the LS mode. The second node that has performed concurrent transmission related to the first node awaits a transmission time of the CP message, and transmits the RCP message indicating concurrent transmission to the first node on the basis of the order of ID notation contained in the received CQ message. In this case, a scheduling response period (SRP) indicating a specific time needed to transmit the RCP message for reservation transmission confirmation may be a predetermined time consumed when as many neighbor nodes as the number of CQ-based Tx scheduling times are configured to perform RCP transmission.

Figure 12:
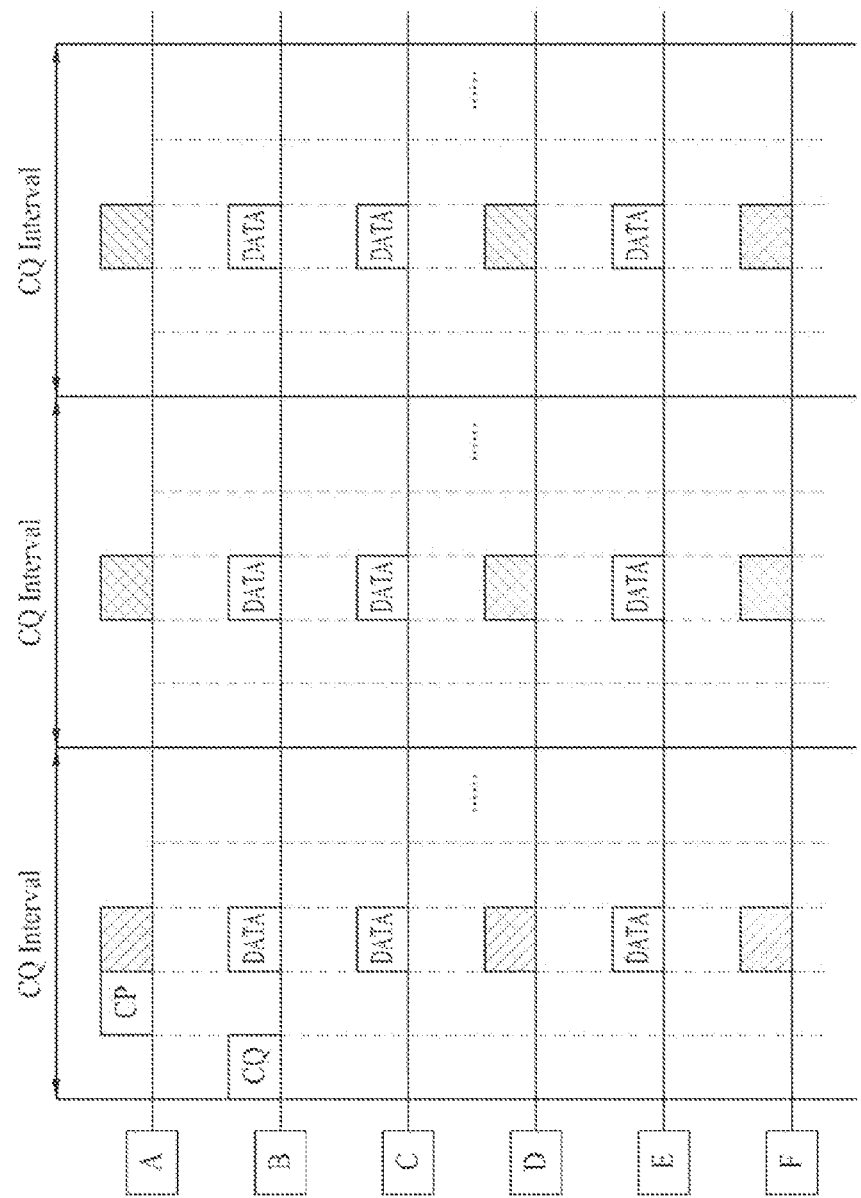

The LS mode is available without using an additional SRP interval as shown in FIG. 12, and operations of the basic LS mode have already been disclosed.

Figure 13:
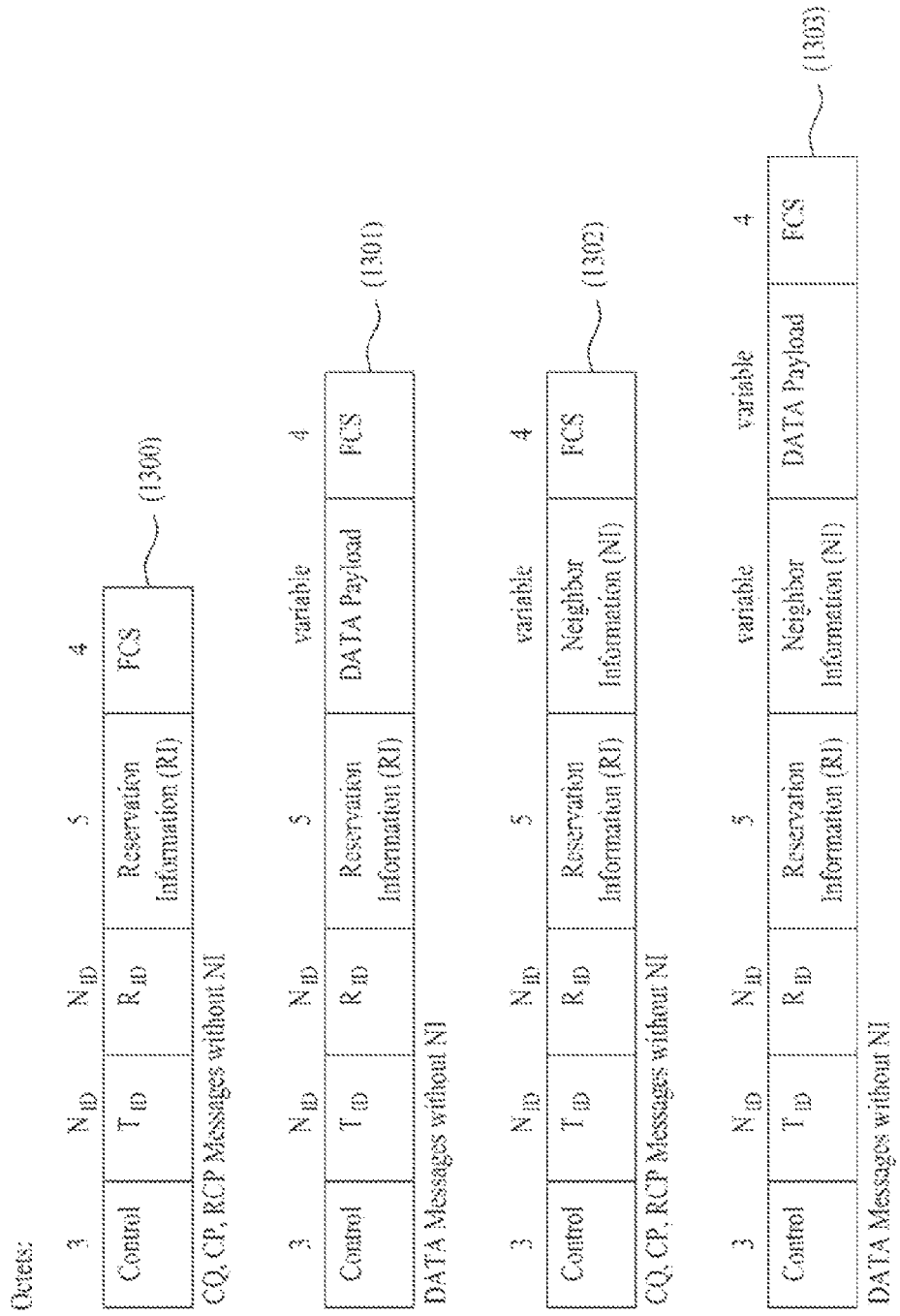
FIG. 13 is a conceptual diagram illustrating types and structures of messages according to individual modes.

Message types and structures needed for individual operations of the BS, RP, and LS modes are shown in FIG. 13. The individual messages are classified according to the Mode field and the Message Type field of the Control field. CQ, CP, RCQ, and RCP messages, each of which has no neighbor information (NI), may be configured as shown in the message 1300. In this case, the DATA message may be configured as shown in 1301. in contrast, the CQ, CP, RCQ, and RCP messages, each of which includes neighbor information (NI), may be configured as shown in 1303. Here, the DATA message may be configured as shown in 1204. In addition, NI may be inserted as necessary. That is, if neighbor node information is changed, the changed NI information is included in Tx information so that the resultant Tx information is transmitted. If neighbor node information remains unchanged and is considered available, the neighbor node information is subtracted from Tx information, resulting in increased efficiency.

FIG. 14 is a conceptual diagram illustrating another communication environment to which the above-mentioned concepts are applied. Specifically, the neighbor node information that is transmitted from a reception (Rx) node and is then retransmitted through a transmission (Tx) node during the connection establishment process will hereinafter be described with reference to FIG. 14.

Referring to FIG. 14(a), nodes are arranged in a 2-hop range, and the CS regions of individual nodes are shown in FIG. 14(b). Here, it is assumed that the node A pre-occupies a channel through the CSMA/CA scheme or the like. ID of 4 bits is allocated to 11 nodes.

Node A pre-occupies a channel through contention, and periodically transmits data through resources obtained through connection establishment related to Node B. In this case, nodes located outside of the CS region of Node B configured to receive signals from the node A, i.e., nodes (E, G, H, K) not corresponding to Node B and 1-hop node can perform concurrent transmission of signals during a time interval in which Node A is used for signal transmission. Here, Node G and Node H attempt to transmit signals to Node I, so that only one of two nodes can perform concurrent transmission.

Figure 15:
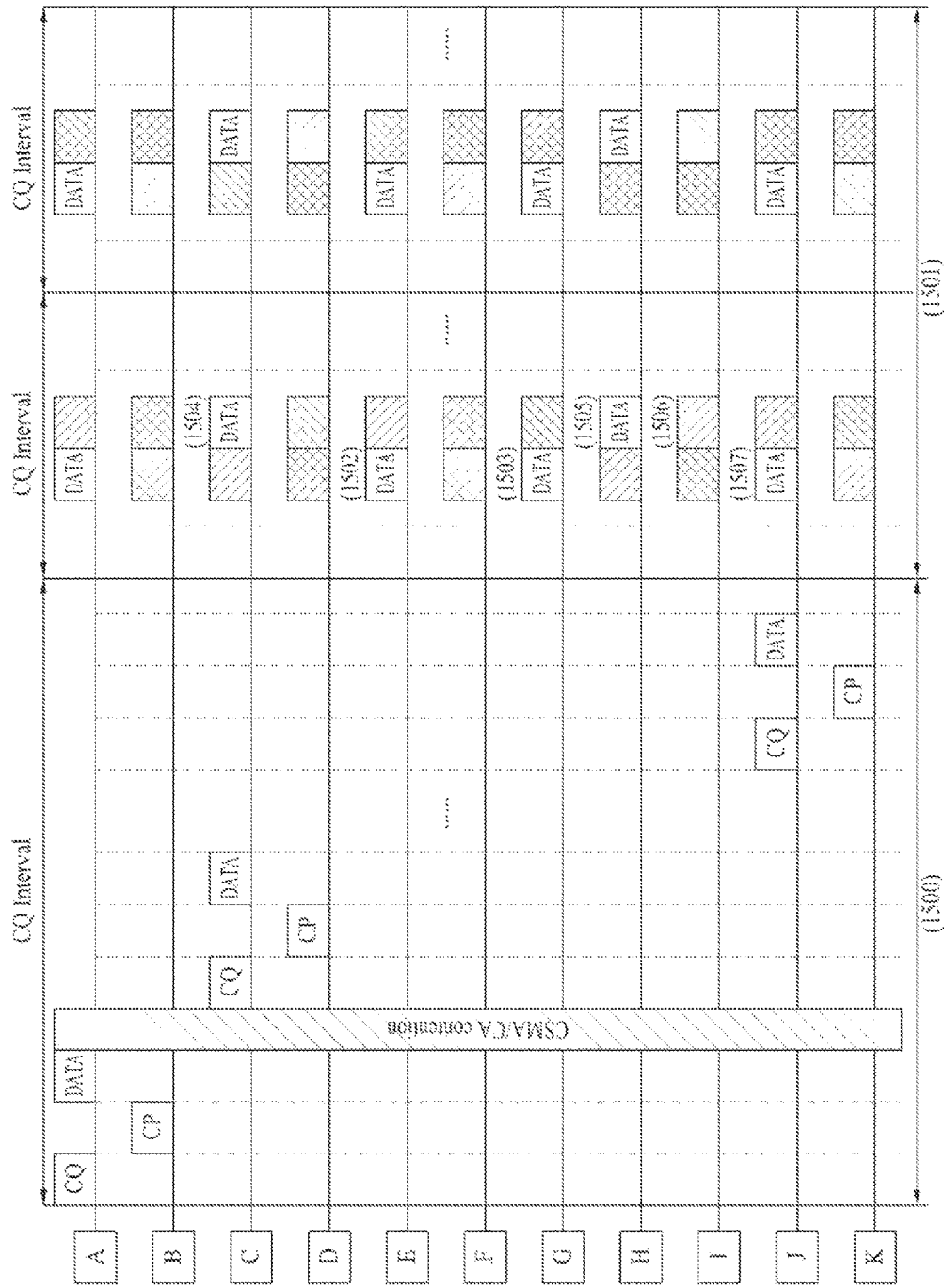
FIG. 15 is a conceptual diagram illustrating concurrent transmission for use in the communication environment shown in FIG. 14.

FIG. 15 shows transmission of nodes that can perform concurrent transmission. Referring to FIG. 15, Node A configured to pre-occupy a channel in initial contention exchanges CQ and CP messages with Node B, and at the same time can perform connection establishment with Node B. During this process, after completion of the connection establishment of Node A in step 1500, nodes having recognized that they do not belong to the neighbor node of Node B perform the connection establishment process with a node to be transmitted. Thereafter, if periodic transmission is performed using resources obtained by Node A through connection establishment in the time intervals 1501, nodes configured to perform concurrent transmission can perform transmission. In more detail, Node E can perform concurrent transmission to Node F in step 1502, Node G can perform concurrent transmission to Node I in step 1503, and Node J can perform concurrent transmission to Node K in step 1507. In this case, transmission of Node J does not affect transmission of other nodes, so that concurrent transmission to Node A can be performed and data transmission may also be performed in the remaining periods other than transmission of Node A. In addition, Node C corresponding to the neighbor node of Node B cannot perform concurrent transmission to Node A, and can perform transmission (1504) simultaneously avoiding periodic transmission.

Figure 16:
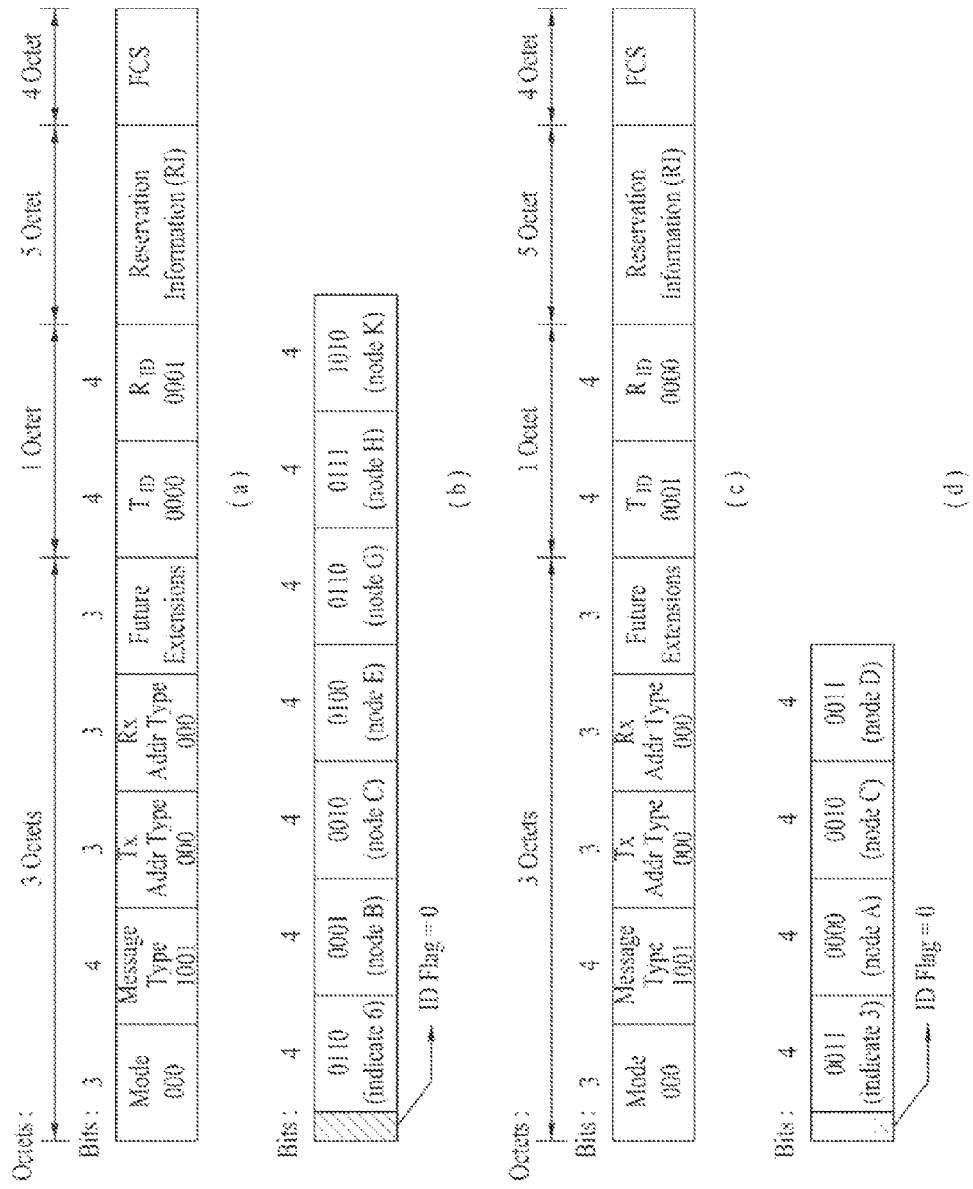
FIG. 16 shows exemplary messages applicable to FIGS. 14 and 15.

In order to support concurrent transmission of other nodes as shown in FIG. 15, messages communicated when Node A and Node B perform connection establishment are shown in FIG. 16.

FIG. 16(a) shows the CQ message transmitted from Node A to Node B, FIG. 16(b) shows the NI field including neighbor node information of Node A. The NI field shown in FIG. 16(b) can be inserted between the RI field and the FCS field. In more detail, messages operate in the BS mode, and the Mode field is set to '000' and operates as the CQ message including the NI field, so that the Message Type field uses '1001' and ID. As a result, the Tx Addr Type field is set to 000, and the Rx Addr Type field is set to 000. TID indicating an ID of a transmission (Tx) node is denoted by 0000, and RID indicating an ID of a reception (Rx) node is denoted by 0001. Referring to the NI field, a total number of neighbor nodes of Node A is set to 6 (B, C, E, G, H, K), such that the Indicator field is denoted by 0110 and IDs of individual nodes can be designated.

Continuously, FIG. 16(c) shows the CP message transmitted from Node B to Node A, and FIG. 16(d) shows the NI field of the CP message. 1-hop neighbor nodes of Node B are denoted by Nodes A, C, and D, the Indicator field is denoted by 0011, and IDs of neighbor nodes are designated.

A data frame transmitted from Node A to Node B may have the same structure as the CQ message. In this case, a data payload part may be added to this data frame. In this case, the NI field may indicate neighbor nodes (A, C, D) of Node B, instead of neighbor nodes (B, C, E, G, H, K) of Node A. In case of 1-hop neighbor nodes (Nodes B, C, E, G, H, K) of Node A configured to hear the above data frames, nodes other than Node C having recognized that Node C is a neighbor node of Node B through information of the NI field can recognize a concurrent transmission available state, such that each node can perform connection establishment.

In case of Node K, when Node A transmits the CQ message to Node B through Node J, Node K can recognize that Node K is a neighbor node of Node A through the NI field contained in the CQ message. Accordingly, when receiving the CQ message from Node J, it is impossible to perform concurrent transmission to Node A, such that the CP message is not transmitted. Alternatively, scheduling information of time resources different from reserved time resources may be contained in the CP message, such that the resultant CP message can be transmitted to Node J.

Meanwhile, as can be seen from FIG. 16, the CP message and the NI field of a message that is transmitted from Node A to Node B independently or together with the data frame may indicate some nodes not corresponding to neighbor nodes of Node B from among neighbor nodes of Node A. In more detail, if Node A marks neighbor nodes (Nodes B, C, E, G, H, K) on the NI field of the CQ message and transmits the resultant NI field, Node B includes some nodes (Nodes K, H, G, E) not corresponding to the neighbor node in the NI field, such that Node B can transmit the CP message. The NI field in which nodes (Nodes K, H, G, E) not corresponding to the neighbor node of Node B can be retransmitted by Node A. In this case, Nodes (K, H, G, E) listening to retransmission information of Node A can recognize that they can perform concurrent transmission to Node A. That is, this means that a white list regarding concurrent transmission may be contained in the NI field.

In contrast, a black list is contained in the NI field so that the black list is transmitted through the CP message and may be retransmitted by Node A. That is, the NI field may indicate nodes (e.g., Node C) corresponding to the neighbor node of Node B from among neighbor nodes (Nodes B, C, E, G, H, K) of Node A. Node C having received this indication information can recognize that Node C cannot perform concurrent transmission along with Node A.

Figure 17:
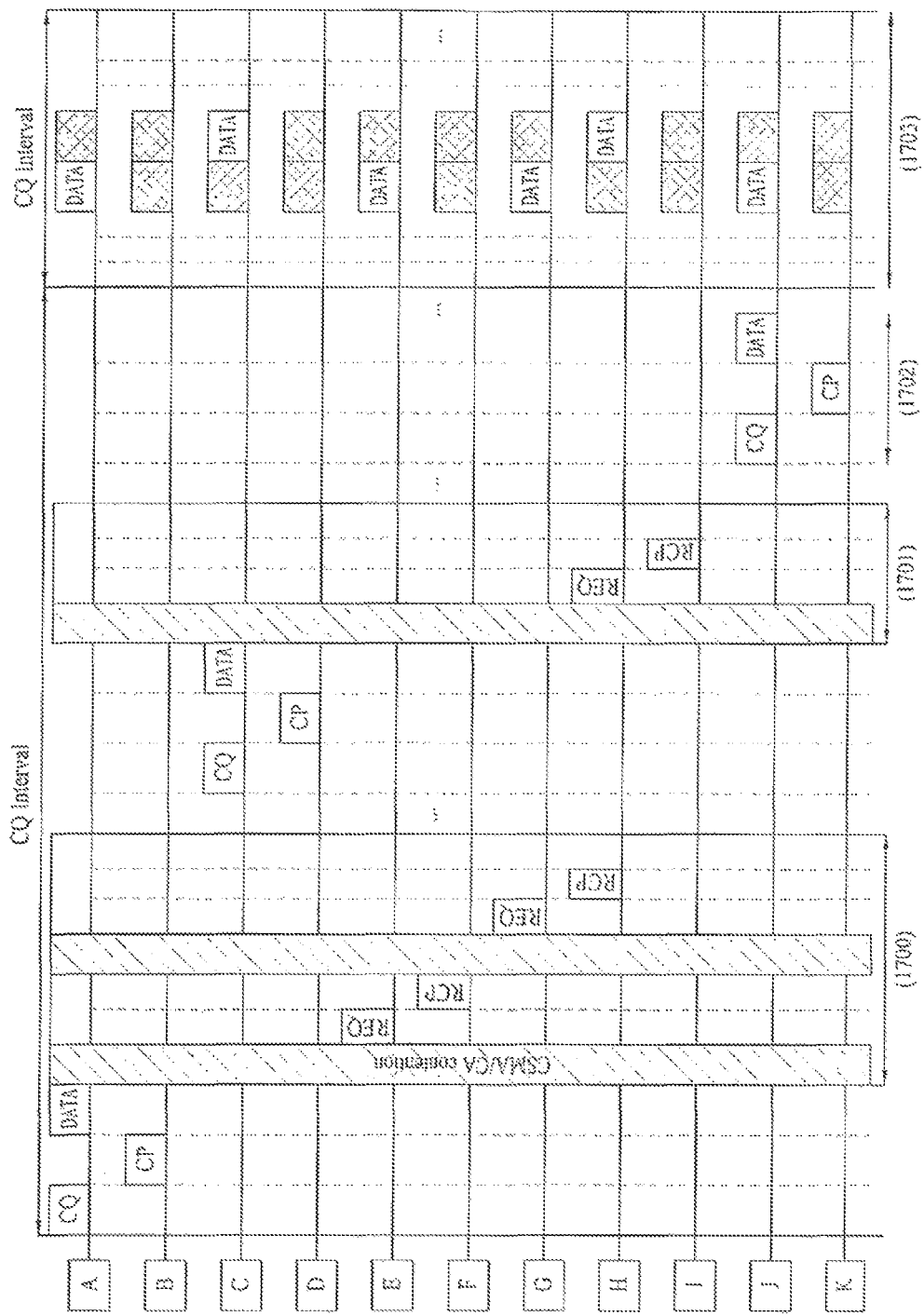
FIG. 17 is a conceptual diagram illustrating the system of one embodiment operates in a reservation period mode.

FIG. 17 shows that nodes of FIG. 14 operate in the RP mode. Individual nodes exchange the RCP and RCQ packets with each other during the reservation period (RP), so that they can reserve the next transmission. Nodes E and G having obtained a channel through CSMA/CA contention perform periodic transmission reservation through exchange of the RCQ and RCP messages in step 1700. Thereafter, Node C performs exchange of CQ-CP-DATA messages through channel acquisition, a second RP begins, and Node H performs transmission reservation in step 1701. Finally, Node J performs channel reservation in step 1702. During a reserved time interval starting from the CQ interval, the corresponding nodes are configured to transmit messages in step 1703. Tx/Rx messages of nodes have the same format as in FIG. 16. However, the Mode field will be changed to '001' indicating the RP operation mode, and the Message Type fields of the RQ and RP messages will be respectively changed to '0010' and '0011' (this means an exemplary case not including 'NI'), or will be respectively changed to '1010' and '1011' (this means an exemplary case including 'NI').

Figure 18:
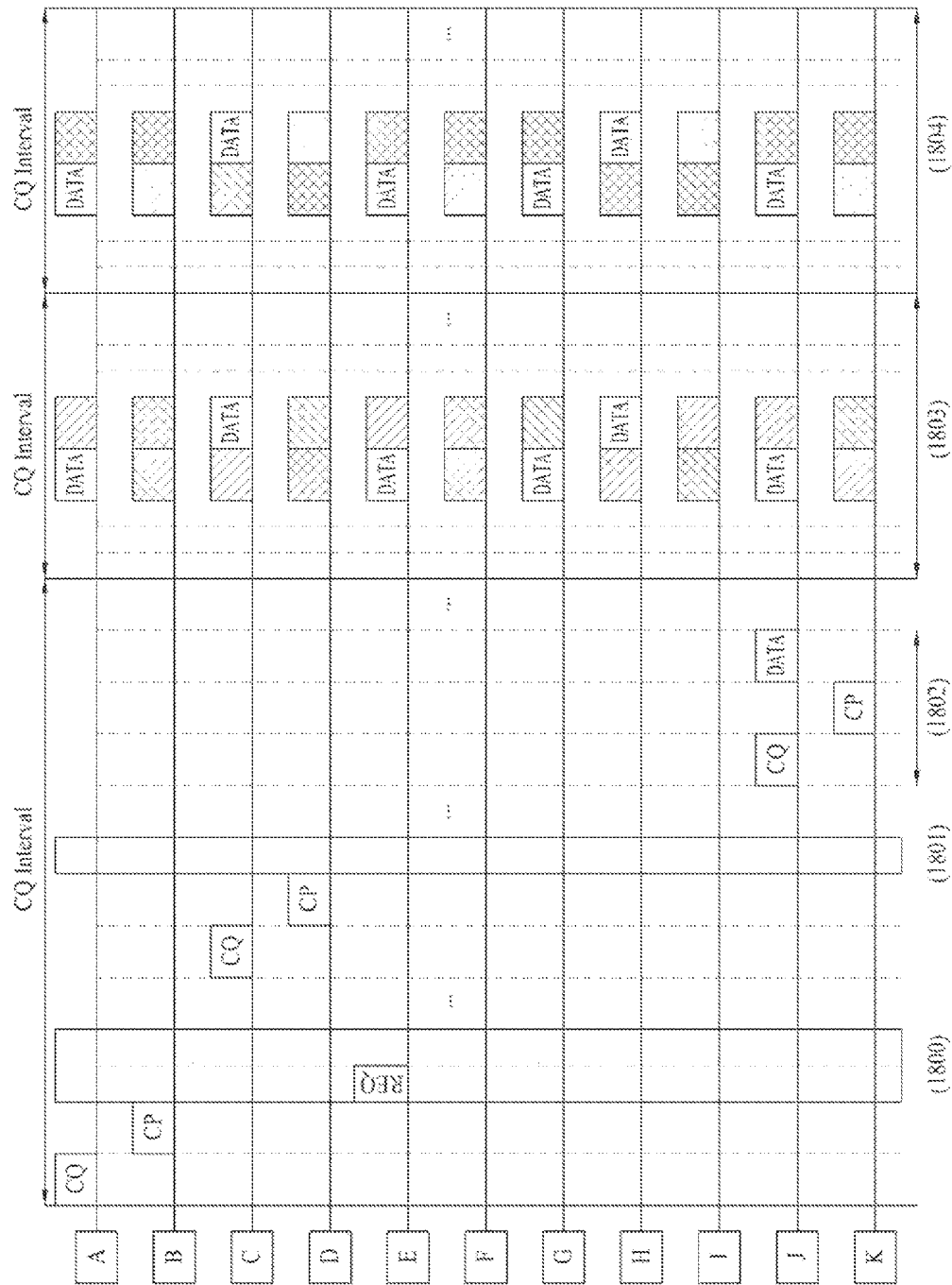
FIG. 18 is a conceptual diagram illustrating the system of one embodiment operates in a regional scheduling mode.

FIG. 18 is a conceptual diagram illustrating nodes of FIG. 14 configured to operate in the LS mode. Assuming that reserved transmission is performed in the past reservation process, Node B can anticipate the presence of reservation transmission identical to the past transmission, such that Node B transmits the CQ message including IDs of Nodes E and G so as to perform SRP triggering in step 1800. Node E transmits the RCP message in response to the CQ message so as to indicate a participation status. In contrast, Node G assumes the absence of a frame to be transmitted, so that Node G does not transmit the RCP. In conclusion, Node B does not perform periodic transmission reservation. After lapse of a predetermined time through the CSMA/CA contention, Node C obtains a channel and reserves own transmission. In this case, Node H participating in the past reservation process can participate in this process through the RCP message in step 1801. Transmission of Node J is irrelevant to the past reservations, such that separate reservation is achieved in step 1802. Thereafter, reserved transmission will be performed from the CQ interval in steps 1803 and 1804.

Figure 19:
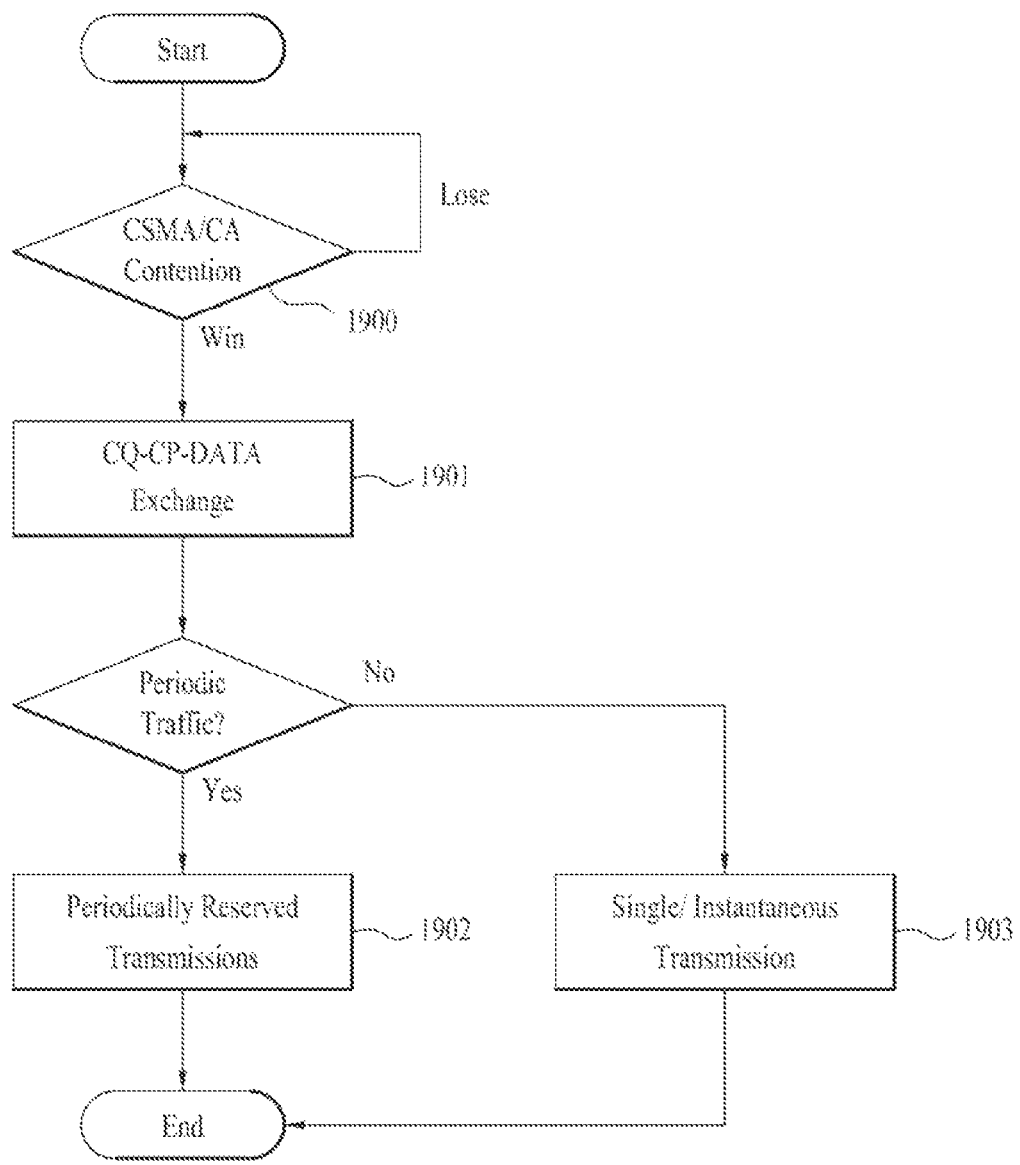
FIGS. 19 to 21 are flowcharts illustrating operations of individual modes.

FIG. 19 is a flowchart illustrating operations of the BS mode. During the BS mode, the CQ-CP-DATA messages can be exchanged between nodes having obtained a channel through the CSMA/CA contention 1900 in step 1901. In case of periodic traffic, reserved transmission begins from the next period through periodic transmission reservation in step 1902. Otherwise, this operation results in solitary transmission in step 1903.

Figure 20:
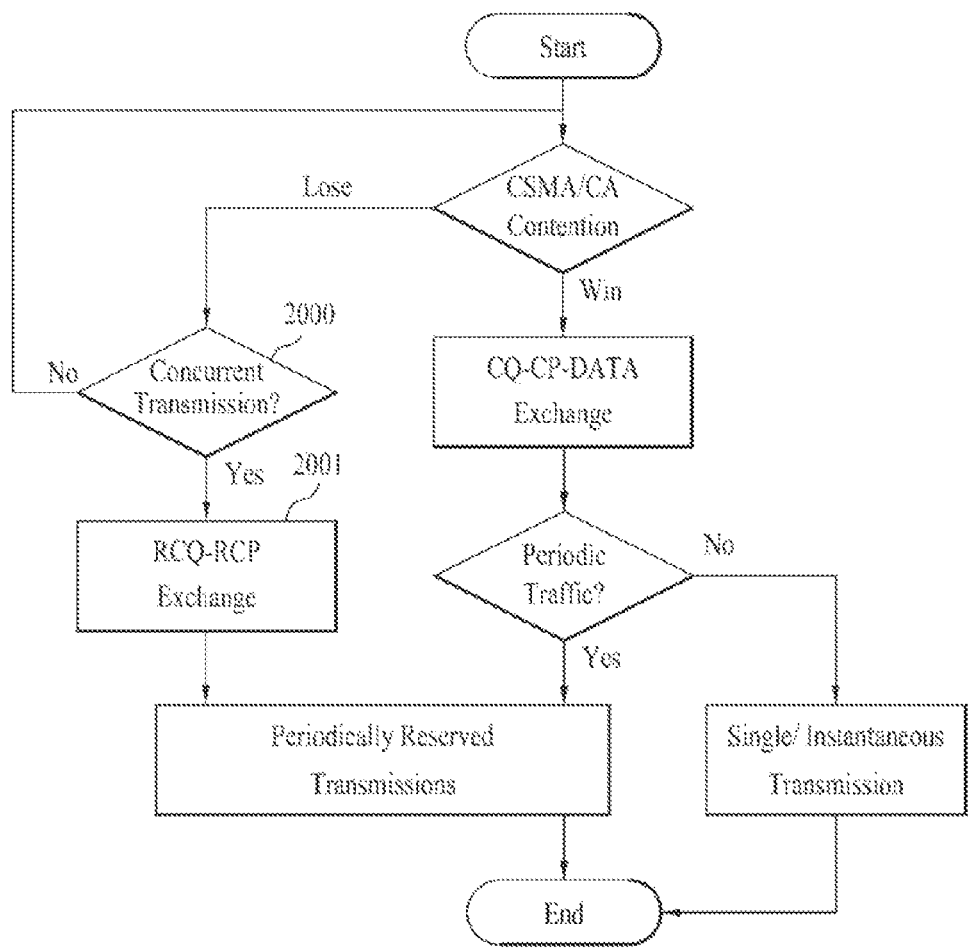

FIG. 20 is a flowchart illustrating operations for use in the RP mode. During the RP interval, a specific node determines whether simultaneous transmission is possible in step 2000, and the RCQ-RCP messages can be exchanged through CSMA/CA contention in step 2001, such that the node participates in reservation.

Figure 21:
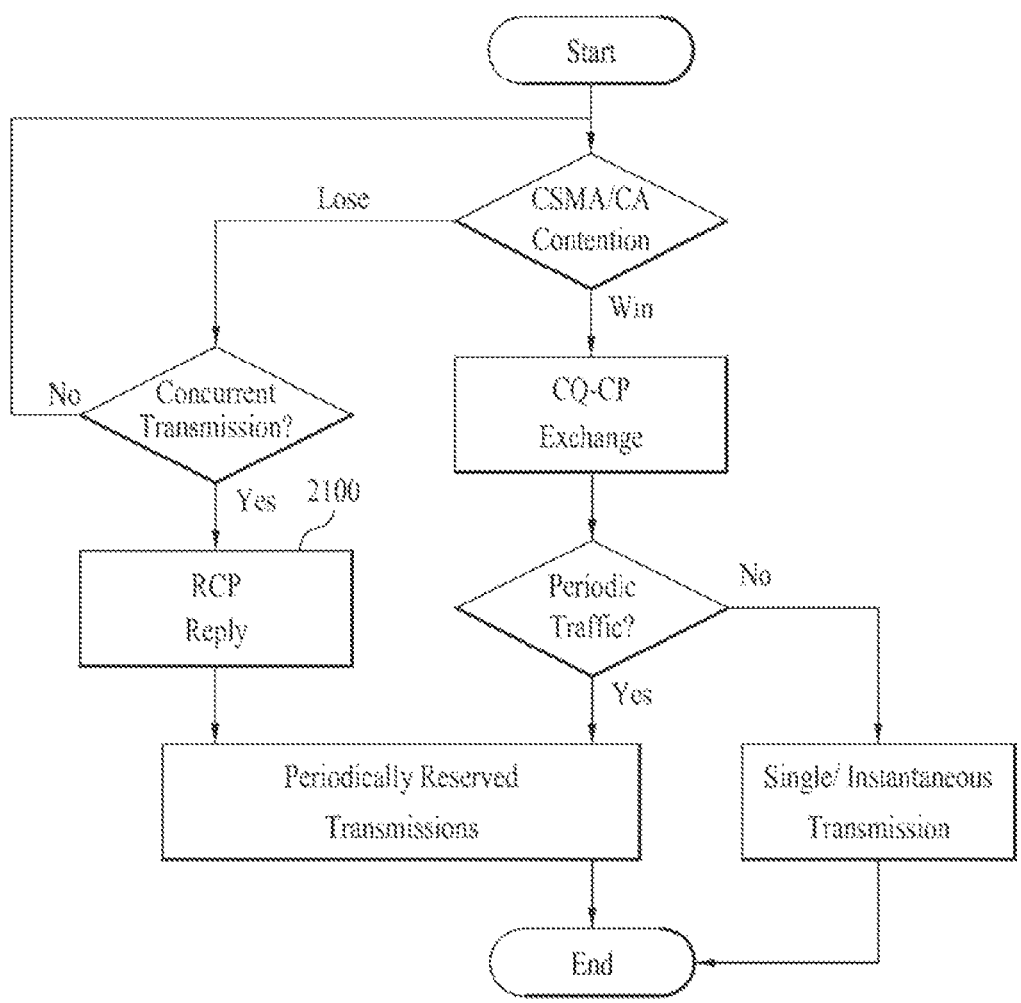

FIG. 21 is a flowchart illustrating operations for use in the LS mode. The operations of FIG. 21 are similar to those of the RP mode of FIG. 20. There is a difference in Tx message and a reservation process between FIG. 20 and FIG. 21. That is, concurrent transmission and reservation participation are achieved through an RCP reply 2100 within the SRP interval.

Figure 22:
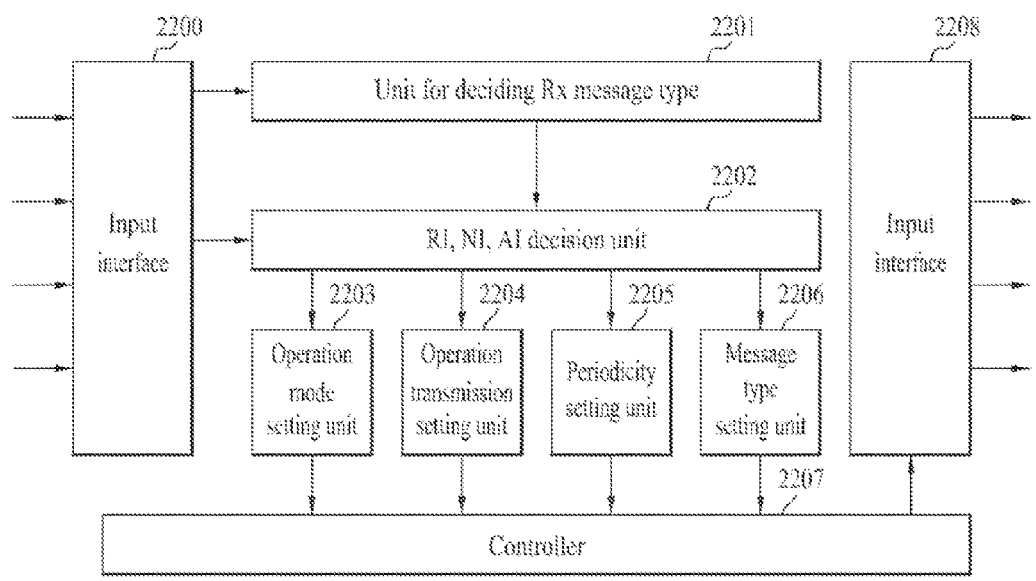
FIG. 22 is a block diagram illustrating a device applicable to embodiments of the present invention.

FIG. 22 is a block diagram illustrating a node device according to one embodiment of the present invention. Referring to FIG. 22, a unit 2201 for deciding a reception message type determines a type of a message received from an input unit 2200 through the Message Type field part of the message. A unit 2202 for deciding RI, NI, and AI information decides RI, NI, and AI information contained in the message. Thereafter, the operation mode of the device is decided by an operation mode setting unit 2003, and a type of a message to be transmitted is established by the message type setting unit 2006. A concurrent transmission setting unit 2004 determines whether traffic to be transmitted performs concurrent transmission along with legacy traffic. In addition, a periodicity setting unit 2005 establishes periodicity in step 2205. Here, the Rx message type decision unit 2201, the RI, NI, AI decision unit 2202, the operation mode setting unit 2003, the concurrent transmission setting unit 2004, the periodicity setting unit 2005, and the message type setting unit 2006 may be achieved separately from the controller. The corresponding operations may be performed by the controller 2207.

The specific configurations of the node device may be implemented such that the various embodiments of the present invention are performed independently or two or more embodiments of the present invention are performed simultaneously. Redundant matters will not be described herein for clarity.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

Although the embodiments of the present invention have been disclosed on the basis of the IEEE 802.11 system, the embodiments can be equally or equivalently applied to various wireless communication systems.

The invention claimed is:

1. A method for transmitting a signal by a first node in a wireless communication system, comprising:
   receiving, by the first node from a second node, a connection request message requesting a connection to second reception node;
   receiving, by the first node from the second node, a data transmitted to the second reception node,
   wherein the data includes first neighbor node information of a second reception node;
   if the first neighbor node information does not indicate the first node as a neighbor node of the second reception node, performing, by the first node, a connection establishment with a first reception node for a reserved transmission; and
   transmitting, by the first node, data to the first reception node within a time interval reserved by the second node for transmitting the data to the second reception node.

2. The method according to claim 1, wherein the first node retransmits second neighbor node information received from the first reception node to the first reception node while performing the connection establishment.

3. The method according to claim 2, wherein the second neighbor node information indicates a neighbor node of the first reception node.

4. The method according to claim 3, wherein the second neighbor node information indicates a node not corresponding to the neighbor node of the first reception node from among neighbor nodes of the first node.

5. The method according to claim 3, wherein the second neighbor node information indicates a node corresponding to the neighbor node of the first reception node from among neighbor nodes of the first node.

6. The method according to claim 2, wherein the second neighbor node information is transmitted simultaneously with data during the connection establishment.

7. The method according to claim 1, wherein any neighbor node is a node included in a carrier sensing (CS) region of a corresponding node.

8. The method according to claim 1, wherein either of the time interval reserved by the connection establishment or the time interval reserved by the second node is a periodic time interval.

9. The method according to claim 1, wherein the performing the connection establishment includes:
   transmitting, to the first reception node, a connection request message for the time interval reserved by the second node;
   receiving, from the first reception node, a connection response message in response to the connection request message; and
   transmitting, to the first reception node, the data after reception of the connection response message.

10. The method according to claim 1, wherein:
    for any signal transmission within the time interval reserved by the second node, the first node performs the connection establishment with the first reception node after completion of a connection establishment of the second node.

11. The method according to claim 1, wherein:
    for any signal transmission to the first reception node within the time interval reserved by the second node, the first node performs the connection establishment with the first reception node during a predetermined reservation period after completion of a connection establishment with the second node.

12. The method according to claim 11, wherein the predetermined reservation period is configured in a manner that only nodes that are not neighbors of the second reception node perform a channel access contention.

13. A first node device for use in a wireless communication system, comprising:
    a transceiver; and
    a processor configured to control the device including the transceiver,
    wherein the processor is configured to:
       control the transceiver to receive from a second node a connection request message requesting a connection to second reception node,
       control the transceiver to receive from a second node a data transmitted to the second reception node,
       wherein the data includes first neighbor node information of a second reception node,
       if the first neighbor node information does not indicate the first node as a neighbor node of the second reception node, perform a connection establishment with a first reception node for a reserved transmission, and
       control the transceiver to transmit data to the first reception node within a time interval reserved by the second node for transmitting a signal to the second reception node.

* * * * *